(12) United States Patent
Nakanishi et al.

(10) Patent No.: US 10,593,142 B2
(45) Date of Patent: Mar. 17, 2020

(54) PAPER SHEET PROCESSING SYSTEM AND PAPER SHEET PROCESSING METHOD

(71) Applicants: Kabushiki Kaisha Toshiba, Tokyo (JP); Toshiba Infrastructure Systems & Solutions Corporation, Kanagawa (JP)

(72) Inventors: Ayaka Nakanishi, Yokohama Kanagawa (JP); Ayaka Hoshi, Yokohama Kanagawa (JP)

(73) Assignees: Kabushiki Kaisha Toshiba, Tokyo (JP); Toshiba Infrastructure Systems & Solutions Corporation, Kanagawa (JP)

(*) Notice: Subject to any disclaimer, the term of this patent is extended or adjusted under 35 U.S.C. 154(b) by 18 days.

(21) Appl. No.: 15/927,250

(22) Filed: Mar. 21, 2018

(65) Prior Publication Data

US 2018/0276933 A1    Sep. 27, 2018

(30) Foreign Application Priority Data

Mar. 21, 2017  (JP) .................. 2017-055057
Sep. 22, 2017  (JP) .................. 2017-182930

(51) Int. Cl.
*G07D 11/17*    (2019.01)
*B65G 47/49*    (2006.01)
(Continued)

(52) U.S. Cl.
CPC .............. *G07D 11/17* (2019.01); *B25J 11/00* (2013.01); *B25J 11/0085* (2013.01); *B25J 15/10* (2013.01);
(Continued)

(58) Field of Classification Search
CPC .. G07D 11/0087; G07D 11/165; G07D 11/18; G07D 11/20; G07D 11/235;
(Continued)

(56) References Cited

U.S. PATENT DOCUMENTS

2013/0060375 A1*   3/2013   Sato ................... G07D 11/20
                                                    700/218
2014/0262980 A1    9/2014   Nakada
(Continued)

FOREIGN PATENT DOCUMENTS

CN     101515381 A    8/2009
CN     104050752 A    9/2014
(Continued)

*Primary Examiner* — Jeffrey A Shapiro
(74) *Attorney, Agent, or Firm* — Baker Botts L.L.P.

(57) ABSTRACT

According to one embodiment, a paper sheet processing system includes a paper sheet processing apparatus which includes an inspection device, a reject device, and a first communication module, and a robot device which includes a robot arm and a second communication module. The reject device rejects a rejected paper sheet and a batch card to a rejecting port. When the batch card is detected, the first communication module transmits a predetermined signal to the robot device. Upon receiving the predetermined signal, the robot device takes the rejected paper sheet and the batch card out of the rejecting port by the robot arm, moves them to another storage section, and transmits a move completion signal to the paper sheet processing apparatus.

14 Claims, 18 Drawing Sheets

(51) Int. Cl.
    *B65G 47/51*     (2006.01)
    *B65H 33/04*     (2006.01)
    *G07D 11/23*     (2019.01)
    *G07D 11/28*     (2019.01)
    *G07D 11/30*     (2019.01)
    *B65H 43/04*     (2006.01)
    *B65H 31/30*     (2006.01)
    *B25J 11/00*     (2006.01)
    *B65H 29/00*     (2006.01)
    *B25J 15/10*     (2006.01)

(52) U.S. Cl.
    CPC ........ *B65G 47/493* (2013.01); *B65G 47/5113* (2013.01); *B65H 29/003* (2013.01); *B65H 31/3045* (2013.01); *B65H 33/04* (2013.01); *B65H 43/04* (2013.01); *G07D 11/23* (2019.01); *G07D 11/28* (2019.01); *G07D 11/30* (2019.01); *B65G 2201/022* (2013.01); *B65G 2203/0216* (2013.01); *B65H 2301/531* (2013.01); *B65H 2701/1912* (2013.01); *G07D 2211/00* (2013.01)

(58) Field of Classification Search
    CPC ...... G07D 11/237; G07D 11/25; G07D 11/26; G07D 11/40; G07D 11/30; G07F 19/00; B65H 29/003; B65H 31/3045; B65H 43/04

See application file for complete search history.

(56) References Cited

U.S. PATENT DOCUMENTS

2015/0179013 A1\*   6/2015   Dopfer ............... B65H 31/3045
                                                                   414/416.08
2017/0066600 A1    3/2017   Nakanishi et al.

FOREIGN PATENT DOCUMENTS

| JP | 64-87468 A | 3/1989 |
| --- | --- | --- |
| JP | 2007-156731 A | 6/2007 |
| JP | 2008-3997 A | 1/2008 |
| JP | 2008-250418 A | 10/2008 |
| JP | 2010-182255 A | 8/2010 |
| JP | 2016-31619 A | 3/2016 |
| JP | 2017-54295 A | 3/2017 |

\* cited by examiner

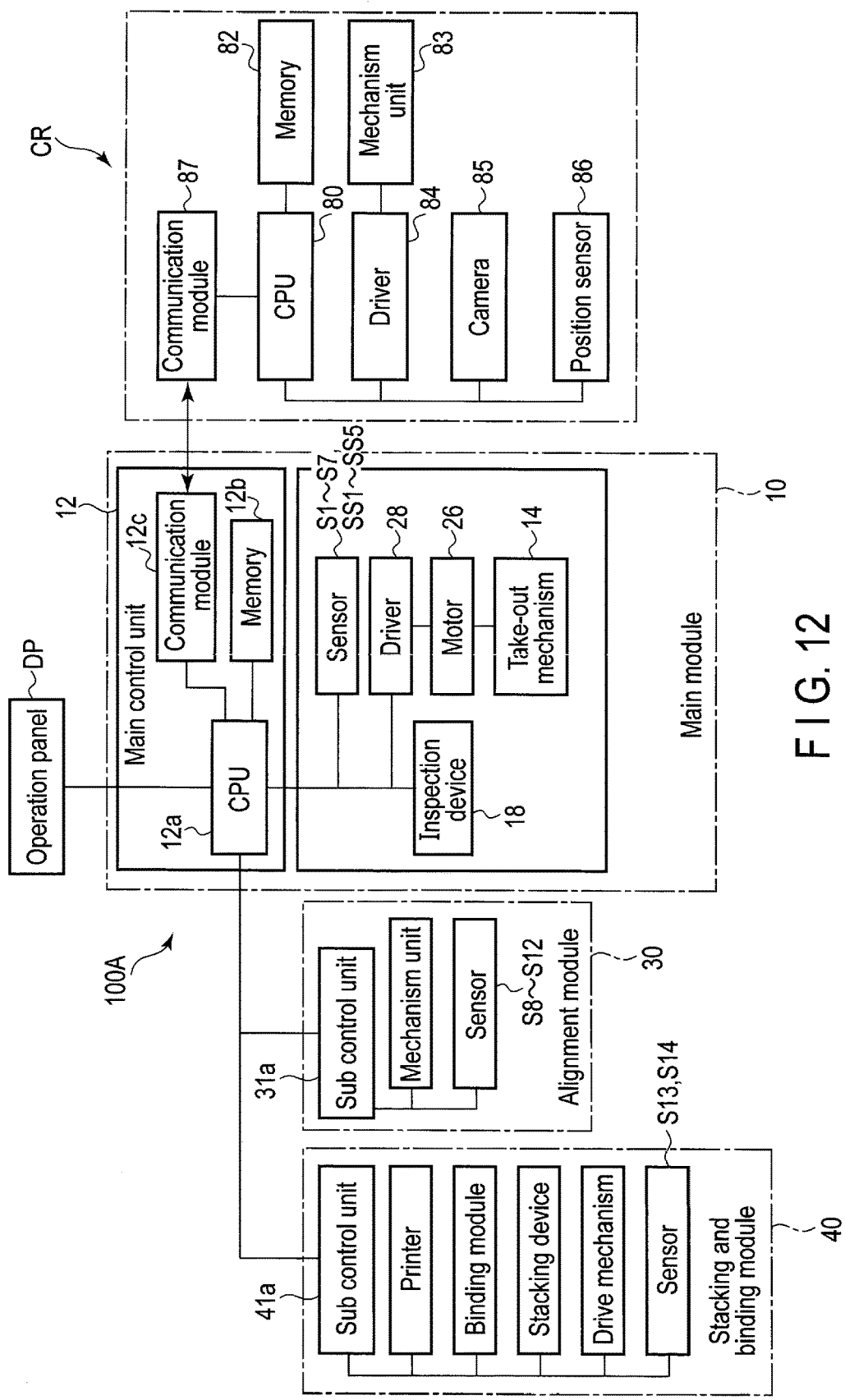
F I G. 12

| Code | Processing content | Target portion | Processing factor |
|---|---|---|---|
| 001 | Paper sheet loading | Processing apparatus A or B | Residual reduction |
| 002 | Eliminating banknote collecting | Discharge ports A, B, C | Batch card detection |
| 003 | Jam releasing | Portions A, B, C | Jam detection |
| 004 | Jam releasing | Portions D, E, F | Jam detection |
| 005 | Cleaning | Sensors A, B, C | Sensor output reduction |
| 006 | Cleaning | Sensors D, E, F | Sensor output reduction |
| 007 | Cleaning | Inspection device | Rejection rate increase |
| 008 | Foreign material discard | Foreign material collecting box | Foreign material detection |
| 009 | Feeder gap adjustment | Adjustment portion | Jam rate increase |
| 010 | .... | .... | |
| 011 | .... | .... | |

TB

F I G. 13

| | Operation information of apparatus A | Operation information of apparatus B |
|---|---|---|
| 1 | Apparatus operating, Stopping, Cleaning | Apparatus operating, Stopping, Cleaning |
| 2 | Apparatus operation time | Apparatus operation time |
| 3 | Processing amount | Processing amount |
| 4 | Eliminating banknote amount | Eliminating banknote amount |
| 5 | Stacked amount | Stacked amount |
| 6 | Residual banknote amount of supply unit | Residual banknote amount of supply unit |

F I G. 14

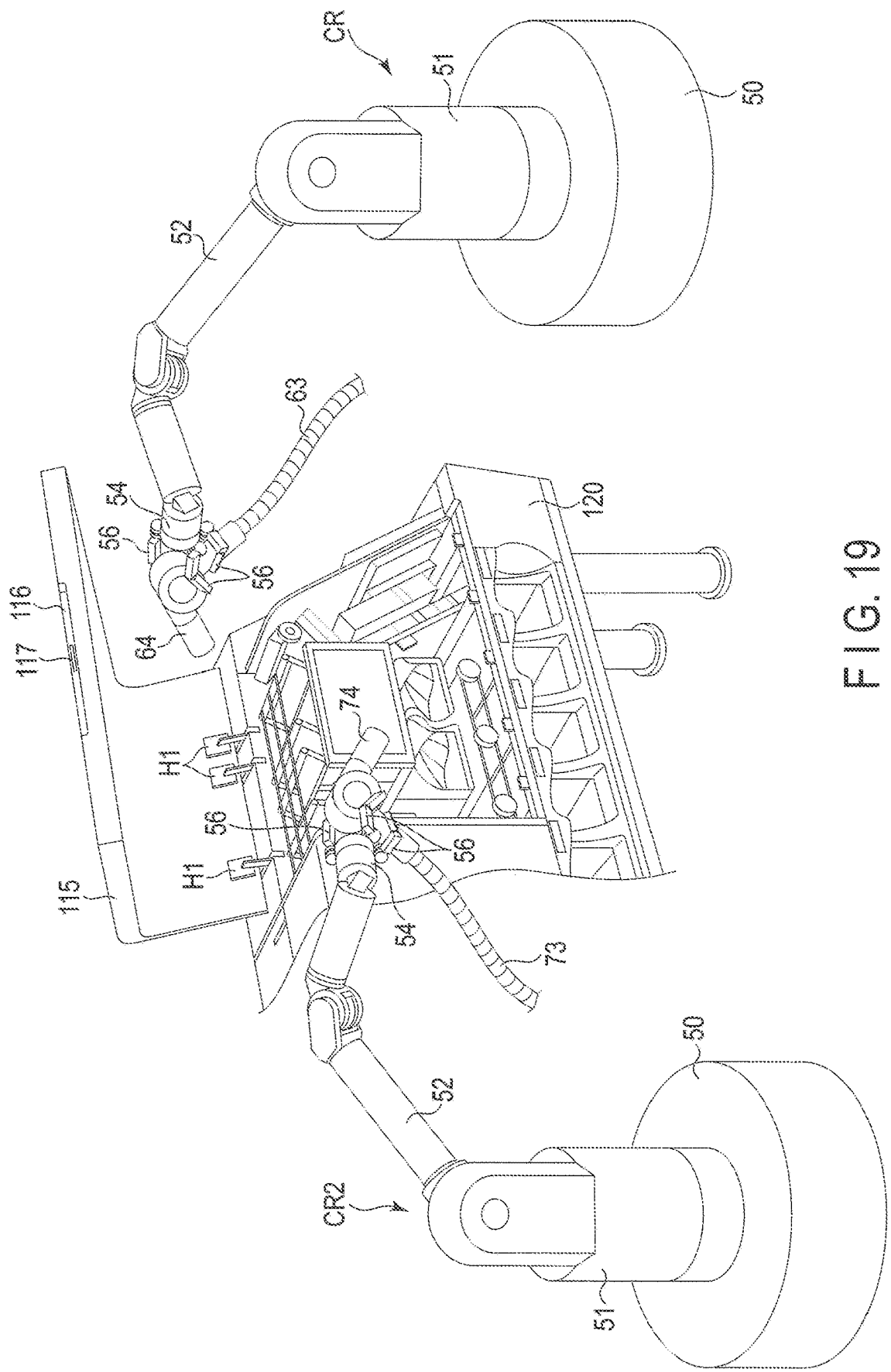
F I G. 19

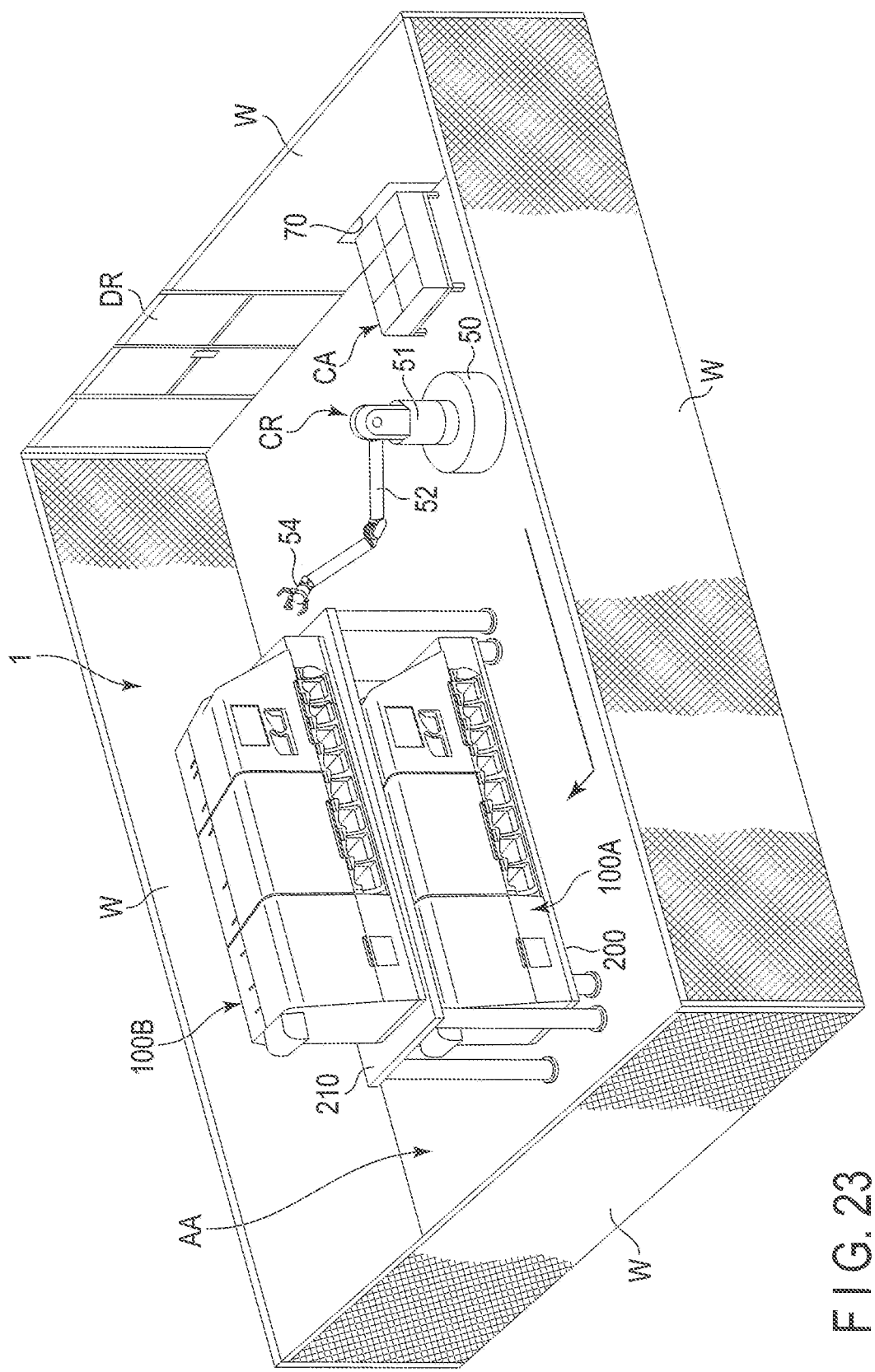
F I G. 23

PAPER SHEET PROCESSING SYSTEM AND PAPER SHEET PROCESSING METHOD

CROSS-REFERENCE TO RELATED APPLICATIONS

This application is based upon and claims the benefit of priority from Japanese Patent Applications No. 2017-055057, filed Mar. 21, 2017; and No. 2017-182930, filed Sep. 22, 2017, the entire contents of all of which are incorporated herein by reference.

FIELD

Embodiments described herein relates to a paper sheet processing system and a paper sheet processing method.

BACKGROUND

In some industry types where a large amount of banknotes are transacted, the banknotes are arranged by par. In such an arrangement, a paper sheet processing apparatus is used. The paper sheet processing apparatus inspects the banknotes. When a banknote does not satisfy a predetermined condition, the paper sheet processing apparatus determines the banknote as a rejecting banknote, and separates a genuine banknote and a rejecting banknote. When a rejecting banknote is detected, the rejecting banknote is necessarily rejected manually, and thus the process becomes complicated. In addition, the paper sheet processing apparatus is maintained periodically. Alternatively, in a case where an unspecified failure occurs, there is a need to be inspected. Such maintenances and inspections are normally performed manually. Therefore, there is a need to call a service person, which may act as a factor of lowering a throughput of the paper sheet processing apparatus.

BRIEF DESCRIPTION OF THE DRAWINGS

FIG. 12 is a block diagram schematically illustrating a configuration of the paper sheet processing apparatus and a processing robot;

FIG. 13 is a diagram illustrating an example of a process table;

FIG. 14 is a diagram illustrating an example of operation information;

FIG. 19 is a perspective view illustrating an example of a configuration in a case where two processing robots are provided;

FIG. 23 is a perspective view of the paper sheet processing system illustrating another layout example of the paper sheet processing apparatus.

DETAILED DESCRIPTION

Various embodiments will be described hereinafter with reference to the accompanying drawings. In general, according to one embodiment, a paper sheet processing system comprises a paper sheet processing apparatus and a robot device. The paper sheet processing apparatus comprises an inspection device which inspects a plurality of input paper sheets and a batch card input together with the paper sheets, a reject device which discharges the batch card to a rejecting port together with a rejected paper sheet not satisfying a predetermined condition in the paper sheets inspected by the inspection device, and a first communication module configured to transmit a predetermined signal indicating that the inspection is performed as much as a processing unit when the batch card is detected by the inspection device. The robot device comprises a robot arm which is capable of holding the paper sheet, and a second communication module configured to transmit and receive a signal.

When the second communication module receives the predetermined signal, the robot device takes out the rejected paper sheet and the batch card by the robot arm and moves to another storage section, and transmits a move completion notification of the rejected paper sheet and the batch card to the paper sheet processing apparatus from the second communication module.

The present disclosure is given as merely exemplary. A person skilled in the art could easily conceive to appropriately modify within the spirit of the invention, and it is a matter of course that all of modifications belong to the scope of the invention. In addition, the drawings may schematically illustrate widths, thicknesses, and shapes of the respective parts compared to the actual appearance in order to make the explanation more clear, but these are given as merely exemplary. The interpretation of the invention should not be limited to the drawings. In the specification and the drawings of this application, the same symbol will be attached to the same element described already in the previous drawings, and the detailed description will be appropriately omitted.

First Embodiment

Figure 1:
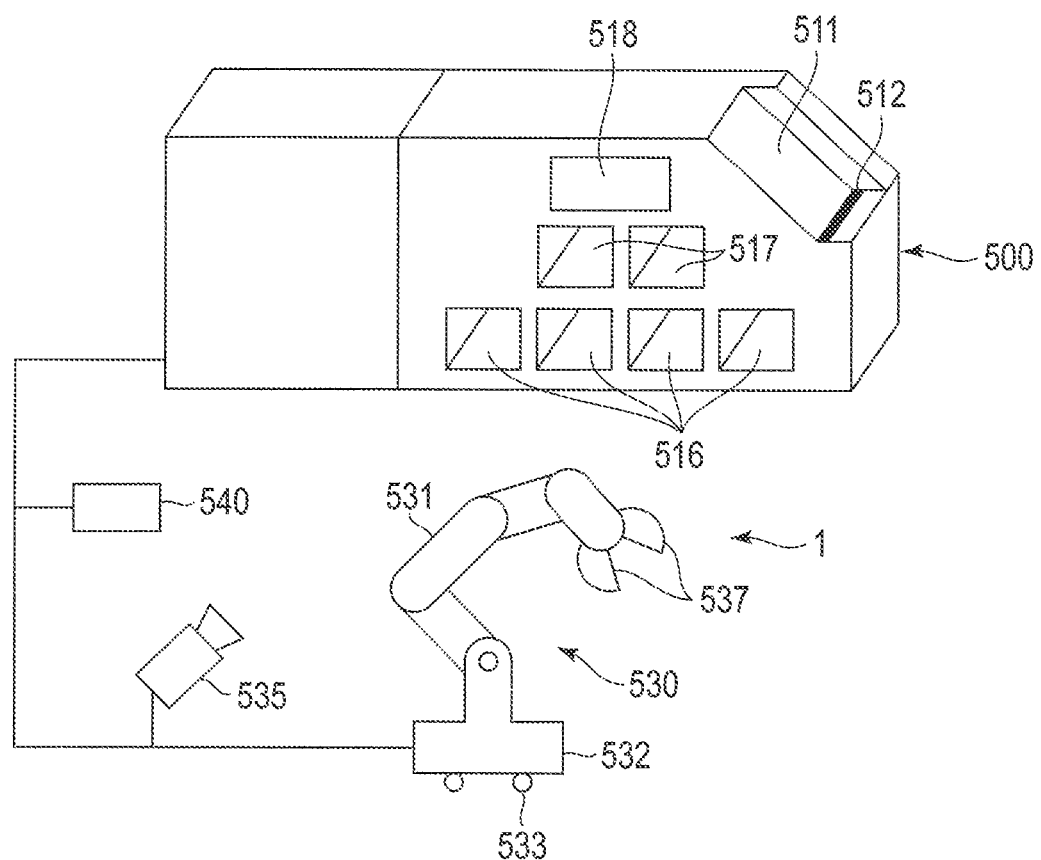
FIG. 1 is a diagram illustrating an example of a configuration of a paper sheet processing system according to a first embodiment.

FIG. 1 is a diagram illustrating an example of a configuration of a paper sheet processing system 1 according to a first embodiment. The paper sheet processing system 1 is, for example, a system which is provided in an access-restricted zone, and automatically arranges paper sheets (for example, banknotes). The paper sheet processing system 1 comprises a paper sheet processing apparatus 500, a robot device 530, and a controller 540 (for example, a computer). The paper sheet processing apparatus 500 is configured to align the paper sheets by performing an authenticity determination to determine whether an input paper sheet such as a banknote is counterfeit, a soundness determination to determine whether a paper sheet is damaged, and a counting process to count the number of paper sheets by par or kind. The robot device 530 is a device which takes out a paper sheet rejected from the paper sheet processing apparatus 500 and carries the taken-out paper sheet to a predetermined place. The paper sheet processing apparatus 500 and the robot device 530 are connected in a wireless or wired manner to communicate with each other, and are controlled in conjunction with each other.

The paper sheet processing apparatus 500 comprises a supply device 511 in which a number of paper sheets (for example, banknotes) are loaded, a plurality of stacking ports 516, a plurality of rejecting ports 517, and a display 518. The supply device 511 includes a take-in port 512. The plurality of paper sheets stacked in the supply device 511 are taken into the apparatus from the take-in port 512 one by one. The plurality of paper sheets taken into the paper sheet processing apparatus 500 are subjected to the various processes and stacked in the stacking port 516. A plurality of the stacking ports 516 are provided in the paper sheet processing apparatus 500 to classify the paper sheets by kind such as par of the paper sheet. In a case where some paper sheets, among the plurality of paper sheets taken into the paper sheet processing apparatus 500, do not satisfy a predetermined inspection condition in the process of the soundness determination or the authenticity determination, the paper sheets are stacked in the rejecting port 517 as rejected banknotes. The display 518 comprises, for example, a touch panel to perform input operations of the paper sheet processing apparatus 500 and to display various types of data.

The robot device 530 comprises, for example, a dolly 532 which includes a wheel 533, a robot arm 531 which is provided on the dolly 532, a hand 537 which is provided at a tip end of the robot arm 531, and a camera 535. The robot arm 531 is a multi-shaft manipulator which includes the hand 537 to hold an object. The robot arm 531 holds a bundle of paper sheets stacked in the stacking port 516 or the rejecting port 517 and takes out the bundle. The robot arm 531 moves the taken-out bundle to another storage device (for example, a storage shelf 550 (see FIGS. 4 and 5)) located at a position different from the paper sheet processing apparatus 500. The dolly 532 includes the wheel 533 which is driven by a motor, and can self-move to any place. Therefore, even when the storage shelf 550 is disposed at a position exceeding a movable range of the robot arm 531, the dolly 532 and the robot arm 531 move, so that the robot arm 531 can take a bundle of paper sheets out of the paper sheet processing apparatus 500 to store the bundle in the storage shelf 550.

The dolly 532 and the robot arm 531 are controlled in operation based on an image recognition of the camera 535. The camera 535 may be provided in the robot arm 531 itself as long as a clear view is secured to recognize an operation of the robot arm 531, or may be provided in a body separated from the robot arm 531.

Figure 2:
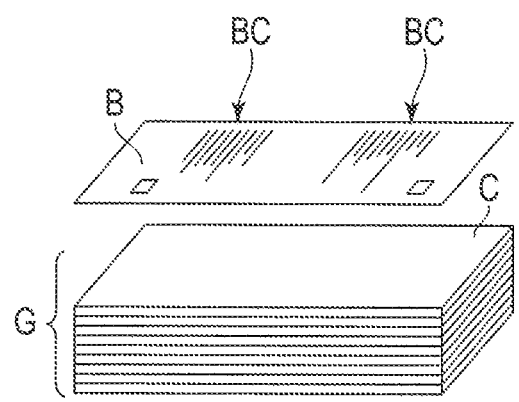
FIG. 2 is a diagram illustrating a paper sheet bundle G and a batch card B which are input to a paper sheet processing apparatus.

FIG. 2 is a diagram illustrating a paper sheet bundle G and a batch card B which are input to the paper sheet processing apparatus 500. The paper sheet bundle G is a bundle obtained by stacking a plurality of paper sheets C. The paper sheet bundle G is one bundle containing a predetermined number of paper sheets C in the counting process. A unit for handling a predetermined number will be called a predetermined unit. The batch card B is attached to one paper sheet bundle G. The batch card B is placed on the uppermost or lowermost position of the paper sheet bundle G, and processed at the end of the processing unit in the paper sheet processing apparatus 500.

The batch card B is, for example, a card in which a barcode BC indicating information of the paper sheet bundle G is printed. The batch card B is formed to be almost the same dimension as the paper sheet C. An inspection history of the paper sheet bundle G is managed by the batch card B. An individual recognition medium such as an RFID (Radio Frequency Identifier) may be used as the batch card B instead of using the barcode as long as a correspondence relation between the paper sheet bundle G and the batch card B can be recognized.

Figure 3:
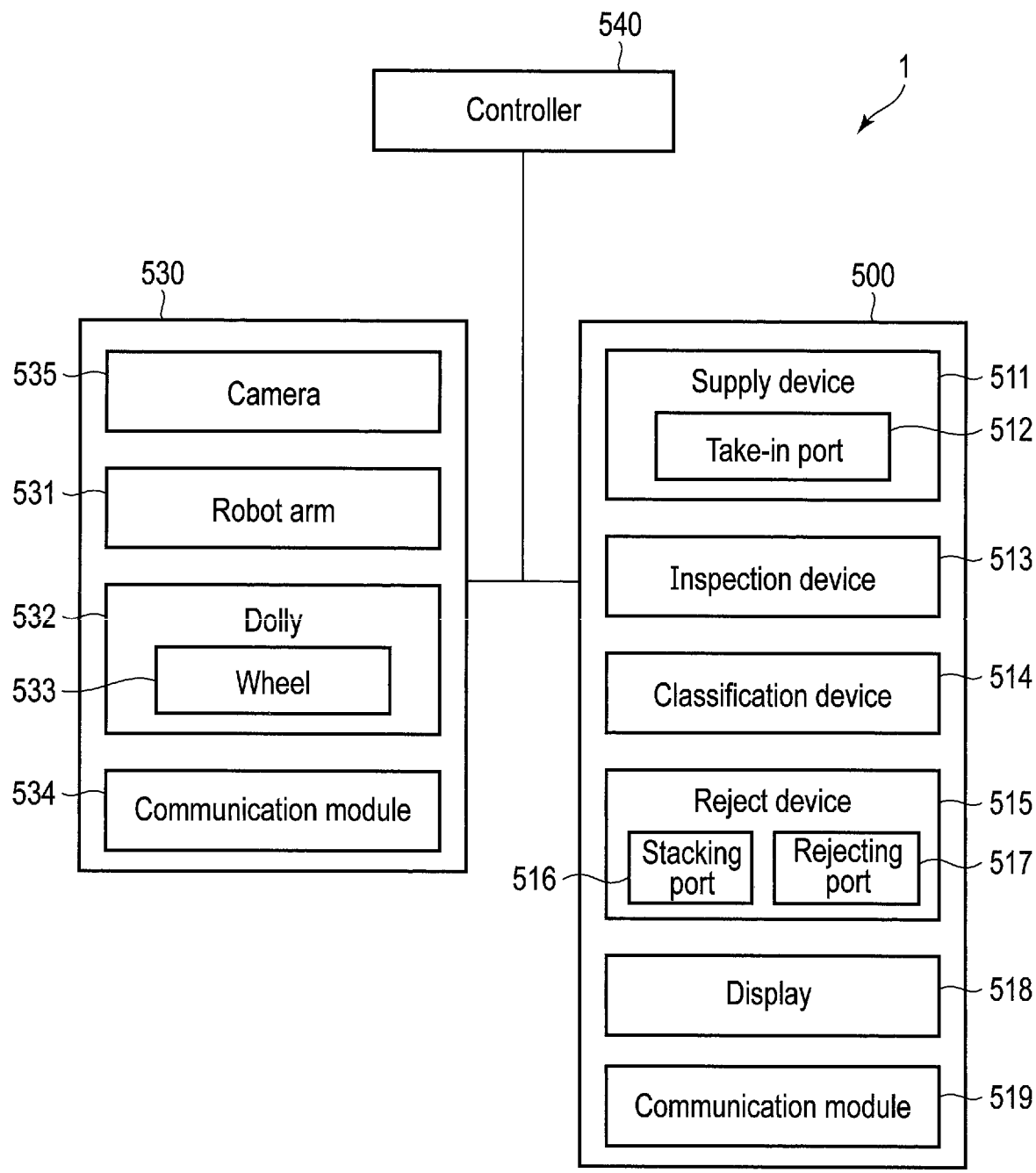
FIG. 3 is a block diagram illustrating an example of a configuration of the paper sheet processing system.

FIG. 3 is a block diagram illustrating an example of a configuration of the paper sheet processing system 1 of the embodiment. The paper sheet processing system 1 includes the paper sheet processing apparatus 500, the robot device 530, and the controller 540. The paper sheet processing apparatus 500 comprises the supply device 511, an inspection device 513, a classification device 514, a reject device 515, the display 518, and a communication module 519.

The paper sheets C in the paper sheet bundle G placed near the take-in port 512 of the supply device 511 is taken into the paper sheet processing apparatus 500 one by one from the take-in port 512. The inspection device 513 inspects the taken-in paper sheet C. The inspection device 513 performs the authenticity determination on whether the paper sheet C is counterfeit, the soundness determination on whether the paper sheet C is damaged, and a determination on whether par and kind are matched. The inspection device 513 determines that the paper sheet C is normal (or correct) in a case where the paper sheet C satisfies a predetermined condition for the inspection in the authenticity determination and in the soundness determination. The inspection device 513 determines that the paper sheet C is a rejecting banknote D in a case where the paper sheet C does not satisfy a predetermined inspection condition.

In addition, in a case where the batch card B is taken out of the take-in port 512, the inspection device 513 reads information contingent on the batch card B based on the barcode BC inscribed in the batch card B, and recognizes that a predetermined unit of paper sheets is subjected to the process. The inspection device 513 acquires the information of the batch card B, and determines the batch card B as the rejecting banknote D. For example, the batch card B is taken in from the take-in port 512 after a predetermined unit of paper sheets C. Therefore, when the batch card B is detected, the inspection device 513 determines a separator of a predetermined unit of processes.

The classification device 514 classifies a normal paper sheet C and a rejecting banknote D based on an inspection result of the inspection device 513. Further, the classification device 514 classifies the normal paper sheets C according to par. In addition, the classification device 514 classifies the batch card B toward the rejecting banknote D based on an inspection result of the inspection device 513.

The reject device 515 includes the plurality of stacking ports 516 and the plurality of rejecting ports 517. The reject device 515 classifies and discharges the paper sheet C classified by the classification device 514 to the stacking port 516 corresponding to each kind or the rejecting port 517. With this configuration, bundles of the paper sheets C of each kind are stacked in the plurality of stacking ports 516. The rejected banknotes D are stacked in the plurality of rejecting ports 517.

The controller 540 transmits a process completion signal to the robot device 530 through the communication module 519, and notifies that a predetermined unit of paper sheets C are arranged and stacked. The process completion signal transmitted by the controller 540 may be transmitted at the time of completing a predetermined unit of processes, or may be transmitted in the middle of processes.

For example, the controller 540 is realized by causing a processor such as a CPU (Central Processing Unit) to execute a program (software). In addition, the controller 540 to be described below may be realized by an LSI (Large scale Integration) of a computer or hardware such as an ASIC (Application Specific Integrated Circuit) and an FPGA (Field-Programmable Gate Array), or may be realized by combination of software and hardware.

The controller 540 interlocks and controls the paper sheet processing apparatus 500 and the robot device 530. The controller 540 may be configured by a PC (Personal Computer), or may be configured integrally to the controller of the paper sheet processing apparatus 500.

The robot device 530 comprises the robot arm 531, the dolly 532, and a communication module 534. When receiving the process completion signal through the communication module 534, the robot device 530 performs a process in which the rejected banknote D and the batch card B are taken out of the rejecting port 517. The robot device 530 is controlled in operation by the controller 540 based on a recognition result of the image captured by the camera 535. While one robot device is exemplified, a plurality of the robot devices 530 may be provided. The respective robot devices 530 may be assigned with roles such as feeding the paper sheet bundle G to the supply device 511, and taking the rejected banknote D and the batch card B out of the rejecting port 517.

Figure 4:
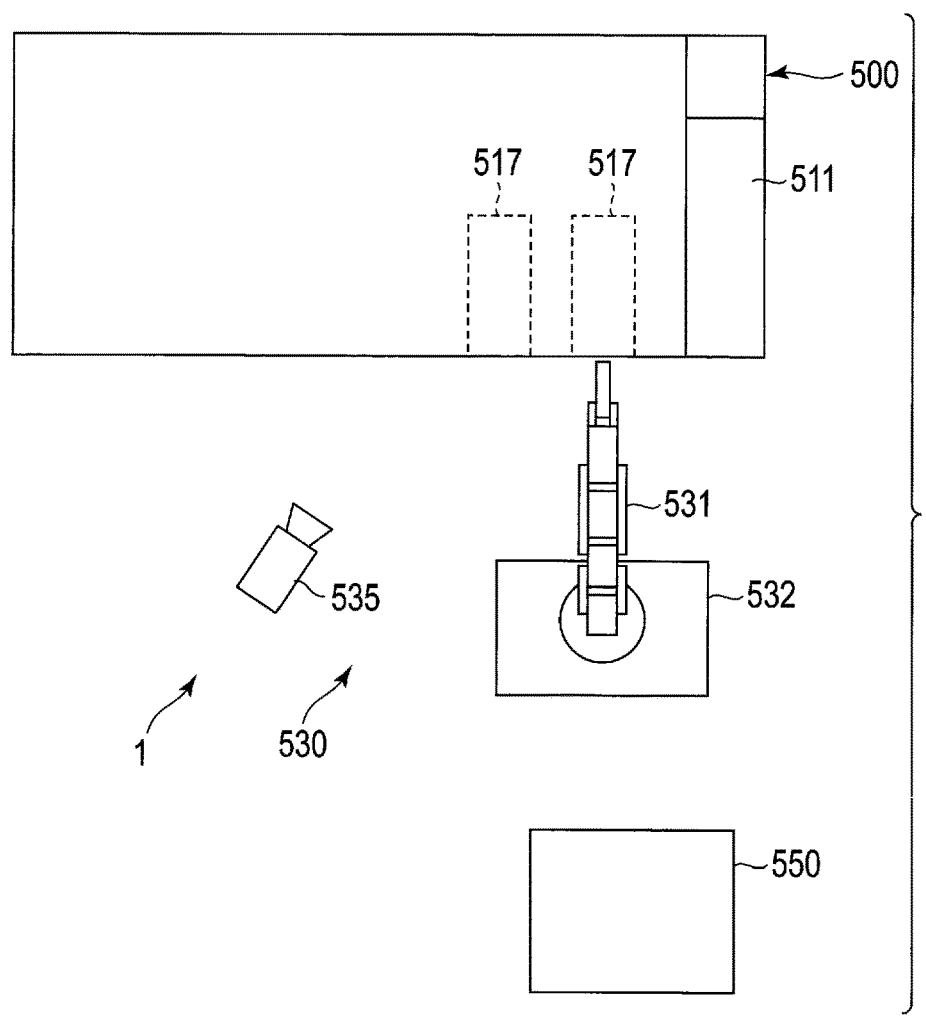
FIG. 4 is a diagram illustrating an arrangement relation between the paper sheet processing system and a storage shelf.

FIG. 4 is a diagram illustrating an arrangement relation between the paper sheet processing system 1 and the storage shelf 550. The storage shelf 550 is disposed to face the paper sheet processing apparatus 500 for example. The robot device 530 is disposed between the storage shelf 550 and the paper sheet processing apparatus 500. The robot arm 531 takes a bundle of rejected banknotes D together with the batch card B. Then, the robot arm 531 stores the bundle of rejected banknotes D and the batch card B in the storage shelf 550.

In a case where the robot arm 531 is out of its operable range for taking-out and storing, the robot device 530 runs the dolly 532 by the wheel 533 to move the robot arm 531 into the operable range. In a case where the bundle of rejected banknotes D is taken out together with the batch card B, the bundle of rejected banknotes D and the batch card B may be loaded again to the supply device 511 by the robot arm 531, or the rejected banknote D may be inspected again.

Figure 5:
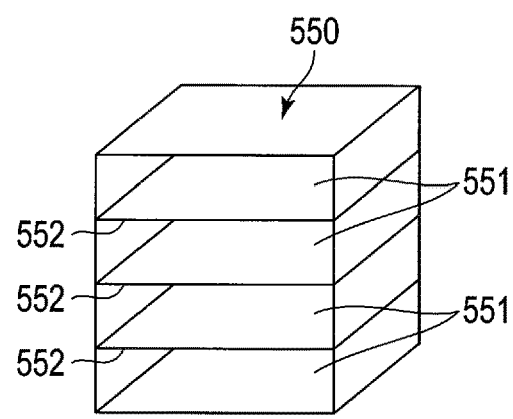
FIG. 5 is a diagram illustrating an example of a configuration of the storage shelf.

FIG. 5 is a diagram illustrating an example of a configuration of the storage shelf 550. The storage shelf 550 has a plurality of storage spaces 551 made by partitions with a plurality of shelves 552. In each of the plurality of storage spaces 551, the rejected banknote D taken out by a batch and the batch card B are stored.

Figure 6:
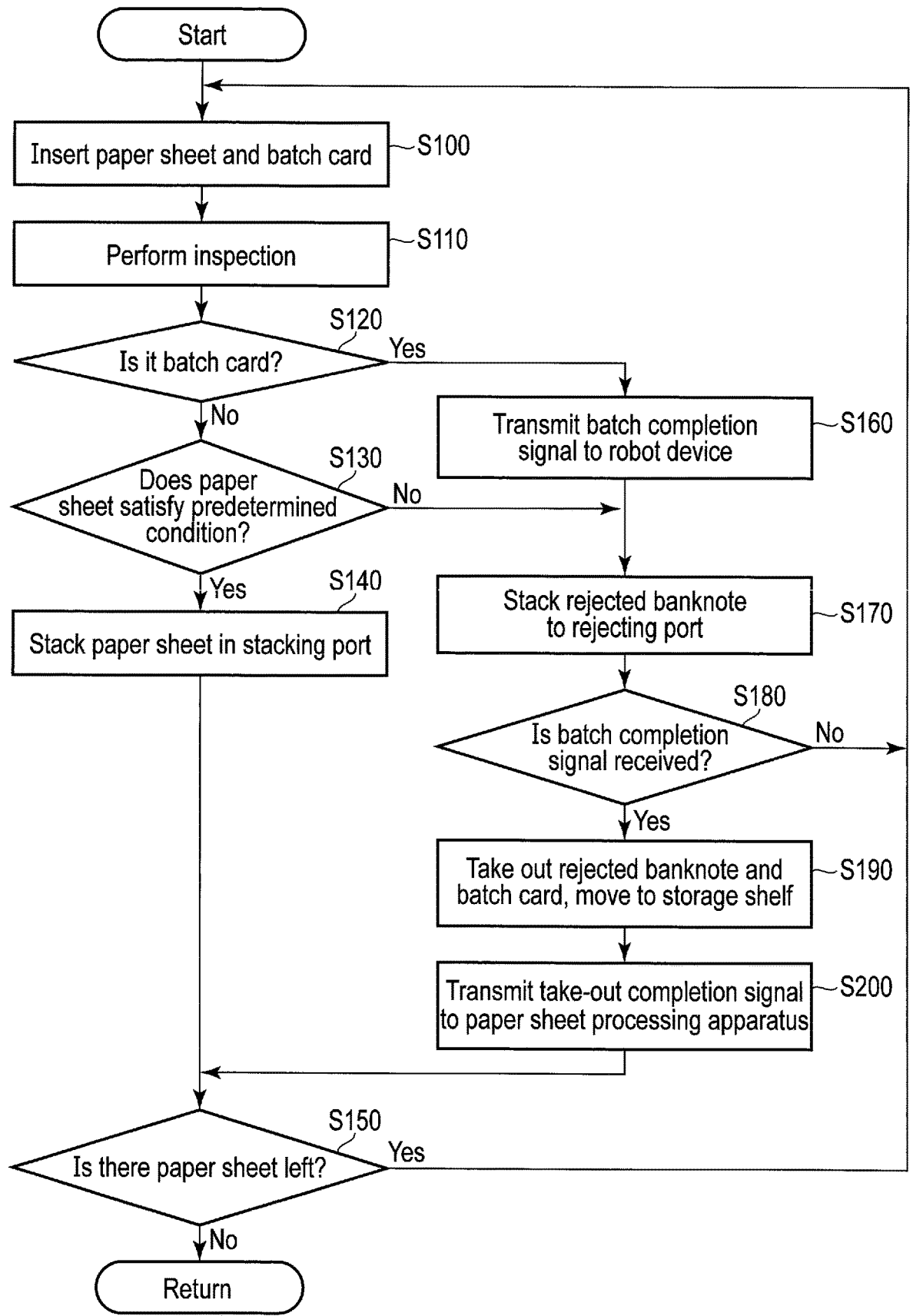
FIG. 6 is a flowchart illustrating a processing flow of the paper sheet processing system.

Next, a process of the paper sheet processing system 1 will be described. FIG. 6 is a flowchart illustrating a processing flow of the paper sheet processing system 1. First, a process performed in the paper sheet processing apparatus 500 will be described. The supply device 511 takes the paper sheets C one by one from the paper sheet bundle G attached with the batch card B, and inserts the paper sheet C in the device from the take-in port 512 (S100). The inspection device 513 inspects the taken-in paper sheet C (S110). The inspection device 513 determines whether the sheet is the paper sheet C or the batch card B (S120). In a case where it is determined that the sheet is the paper sheet C, the inspection device 513 determines whether the predetermined condition for authenticity and soundness of the paper sheet C is satisfied (S130).

In a case where the paper sheet C satisfies the predetermined condition, the classification device 514 classifies the normal paper sheets C by kind. The reject device 515 stacks the classified normal paper sheets C in the plurality of stacking ports 516 by kind (S140).

The paper sheet processing apparatus 500 detects whether the paper sheet C is left in the supply device 511 (S150). In a case where the paper sheet C is left, the paper sheet processing apparatus 500 performs S100 to S140 repeatedly. In a case where it is determined in S130 that the paper sheet C does not satisfy the predetermined condition, the classification device 514 classifies the paper sheet C into the rejecting banknote D, and the reject device 515 stacks the rejecting banknote D in the rejecting port 517 (S170). In addition, in a case where the batch card B is detected in Step S120, the controller 540 transmits a batch process completion signal to the robot device 530 through the communication module 519 (S160), and proceeds to the process of Step S170. The classification device 514 classifies the batch card B into the rejecting banknote D, and the reject device 515 stacks the batch card B in the rejecting port 517 (S170).

Next, the operation of the robot device 530 will be described. The robot device 530 receives the batch process completion signal transmitted from the controller 540 through the communication module 534 (S180: Yes). The controller 540 causes the robot arm 531 to take a bundle of rejected banknotes D and the batch card B out of the rejecting port 517 based on an image recognized by the camera 535, and moves the bundle of rejected sheets D and the batch card B to the storage shelf 550 (S190). The controller 540 transmits a take-out completion signal to the paper sheet processing apparatus 500 through the communication module 534 (S200), and proceeds to the process of Step S150.

According to the first embodiment configured as described above, the paper sheet processing system is configured such that the rejected banknote D and the batch card B are processed by the paper sheet processing apparatus and discharged to a discharge port, and then taken out and moved by the robot device 530 to the storage shelf. Therefore, it is possible to automatically arrange the paper sheets. The paper sheet processing system can take out and store the rejected banknote D by the robot device 530 in the storage shelf 550 without recourse to manpower. Therefore, it is possible to improve safety and work efficiency.

Second Embodiment

Figure 7:
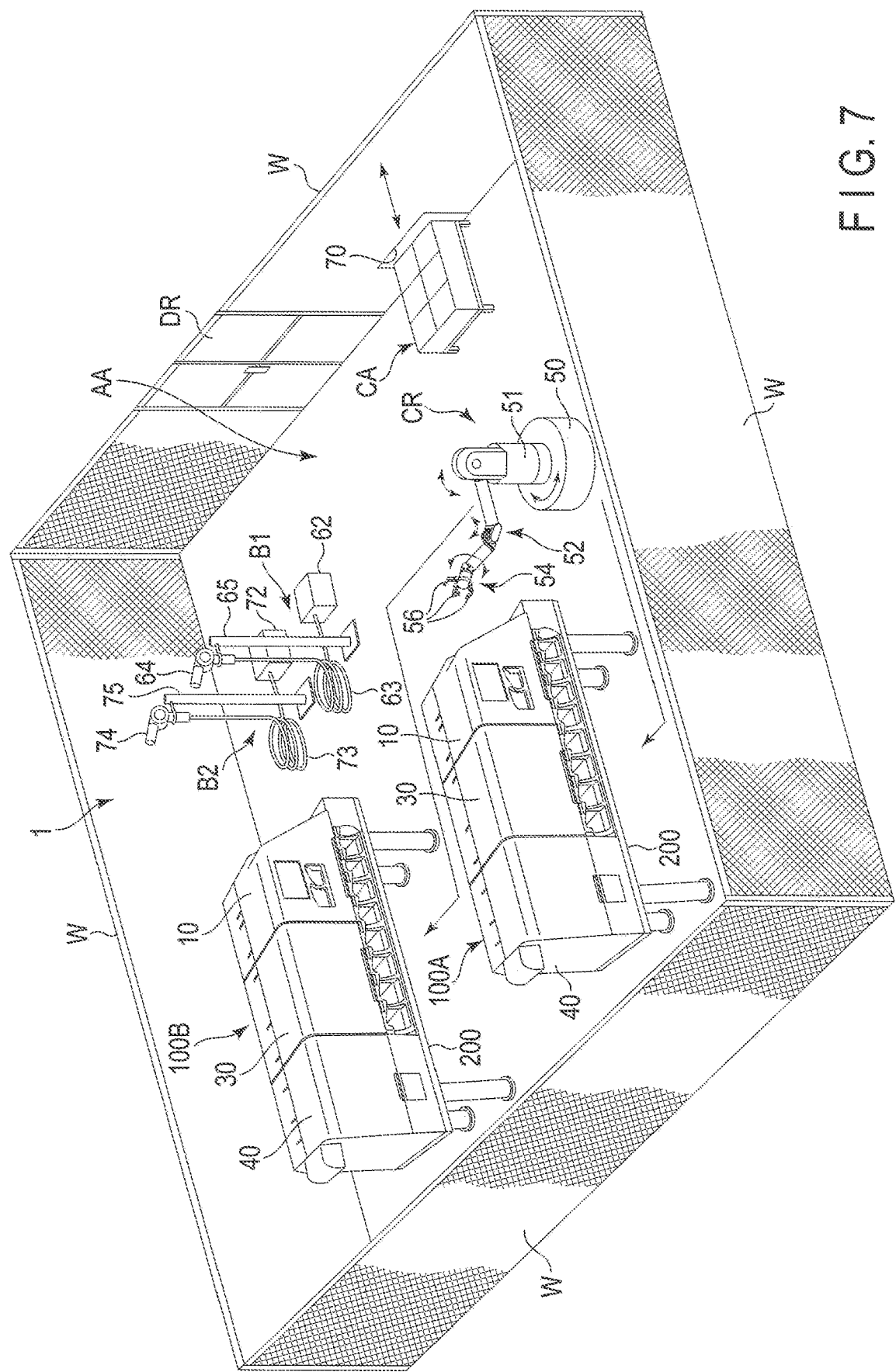
FIG. 7 is a perspective view illustrating the entire paper sheet processing system according to a second embodiment.

FIG. 7 is a perspective view schematically illustrating the entire configuration of a paper sheet processing system according to a second embodiment. As illustrated in FIG. 7, a paper sheet processing system 1 according to this embodiment is provided in an access-restricted zone AA, and automatically arranges the paper sheets, for example, banknotes. For example, the zone AA is surrounded by a plurality of walls W, each of which is made of a wire netting. Part of the wall W is provided with a door DR which is openable and closable. The paper sheet processing system 1 comprises, for example, two paper sheet processing apparatuses 100A and 100B which process banknotes as the paper sheets, and an independent processing robot (robot device) CR which performs an arbitrary processing with respect to the paper sheet processing apparatuses 100A and 100B. Two paper sheet processing apparatuses 100A and 100B are provided in parallel to a horizontal direction. In addition, in this embodiment, the paper sheet processing system 1 comprises a blower device B1 and a vacuum device B2 in order to cleanse a desired portion of the paper sheet processing apparatuses 100A and 100B. The blower device B1 and the vacuum device B2 are provided in the vicinity of the paper sheet processing apparatuses 100A and 100B. Further, the paper sheet processing system 1 comprises a storage cassette CA in which a plurality of banknote bundles and a batch card are stored. The storage cassette CA passes through an opening 70 which is formed in the wall W, and is disposed to go in and out the zone AA.

As an example, the processing robot CR comprises a dolly 50 which can automatically run, a robot arm 52 provided on the dolly 50, and a hand 54 which serves as an end effector provided at a tip end of the robot arm 52. The dolly 50 comprises a plurality of wheels, a motor which drives these wheels, and one or a plurality of position sensors which detect a running direction, a running distance, and a moving position of the dolly 50. A support post 51 is erected on the dolly 50 to be rotatable. The base end of the robot arm 52 is rotatably supported to the support post 51. The robot arm 52 includes one or a plurality of joints, each of which is rotatable. The hand 54 comprises a plurality (for example, three) of hands or fingers 56. These fingers 56 are configured to be opened and closed so as to hold a desired object. At least one finger 56 has a rotatable joint. As described below, the processing robot CR further comprises an electronic eye provided in the hand 54. The electronic eye may be configured by, for example, a reflection sensor, an infrared sensor, and an image pickup camera. The electronic eye senses a target portion to be processed by the processing robot CR, paper sheet information in the storage cassette CA, and various target objects.

The blower device B1 comprises a discharge pump 62, a long hose 63 which is connected to a discharge port of the discharge pump 62, and an injection nozzle 64 which is attached to the tip end of the hose 63. The blower device B1 injects a compressed air from the injection nozzle 64 by drawing a lever (not illustrated) of the injection nozzle 64. Between uses of the blower device B1, the injection nozzle 64 is hanged in a hanger 65 for holding.

The vacuum device B2 comprises a suction pump 72, a long hose 73 which is connected to a suction port of the suction pump 72, and a suction nozzle 74 which is attached to the tip end of the hose 73. The vacuum device B2 sucks an external air using the suction nozzle 74 by drawing a lever (not illustrated) of the suction nozzle 74. Between uses of the vacuum device B2, the suction nozzle 74 is hanged on a hanger 75 for holding.

The processing robot CR holds the injection nozzle 64 by the hand 54, and can carry with the injection nozzle 64 up to a desired position. In addition, the processing robot CR holds the suction nozzle 74 using the hand 54, and can carry with the suction nozzle 74 up to a desired position. The blower device B1 and the vacuum device B2 are not limited to be provided independently, but may also be built in the processing robot CR.

Figure 8:
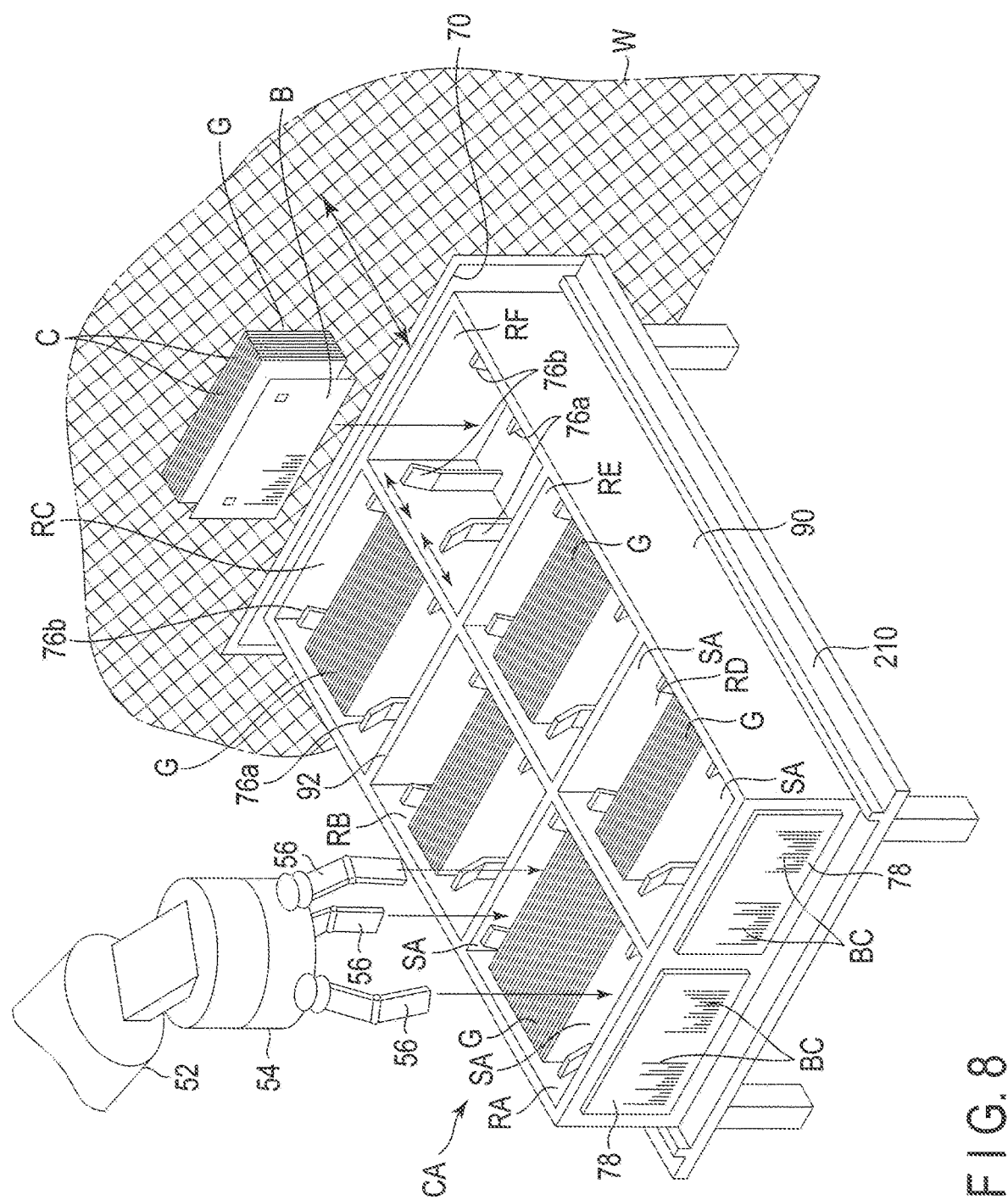
FIG. 8 is a perspective view illustrating a storage cassette of the paper sheet processing system.

FIG. 8 is a perspective view illustrating the storage cassette CA. As illustrated in the drawing, the storage cassette CA includes a storage case 90 which has an opened upper surface or has a rectangular box shape. The inner space of the storage case 90 is divided into a plurality (for example, six) of storage sections RA, RB, RC, RD, RE, and RF by a partition 92 of a lattice shape. Six storage sections RA to RF are disposed in two rows for example. In each of the storage sections RA to RF, a pair of clamp plates 76a and 76b are provided on the side wall of the case and on the inner surface of the partition 92 which face each other. The pair of clamp plates 76a and 76b are disposed to face each other with a gap therebetween. The pair of clamp plates 76a and 76b are movable in directions close to or away from each other. In addition, the pair of clamp plates 76a and 76b are urged in a direction close to each other by an urging member (not illustrated) such as a spring.

Each of the storage sections RA to RF stores one patch of banknote bundles G and a batch card B which are processing targets. The banknote bundle G includes a plurality of stacked banknotes C. The batch card B is disposed to be overlapped with one end of the banknote bundle G. Information on the banknote bundle G, for example, a barcode indicating number of sheets and kind is printed On the batch card B. The banknote bundle G including the batch card B is stored in the storage section and located between the pair of clamp plates 76a and 76b for example. With this configuration, the banknote bundle G and the batch card B are held at a predetermined storage position in a state where both ends in the longitudinal direction are clamped between the clamp plates 76a and 76b. Further, in each storage section, in a state where the banknote bundle G and the batch card B are stored in a predetermined storage position, a space SA is defined on both sides of the banknote bundle G and the batch card B such that the fingers 56 of the processing robot CR can be inserted into the spaces SA.

Display plates 78 are provided on the outer surface of the side wall of the storage case 90. Information with respect to the banknote bundles G stored in the storage cassette CA, for example, barcode BC indicating storage section, number of sheets, and kind is printed on each display plate 78. The processing robot CR reads the barcode BC using the electronic eye and recognizes the information of the banknote bundles G stored in the storage cassette CA. The processing robot CR selects a banknote bundle G based on the read information, holds the selected banknote bundle G using the hand 54, and takes the bundle out of the storage section.

As illustrated in FIGS. 7 and 8, a table 210 is provided in the vicinity of the opening 70 of the wall W in the zone AA. The storage cassette CA is inserted into the zone AA from the outside through the opening 70, and placed on the table 210. In addition, the storage cassette CA can be taken to the outside through the opening 70.

The storage cassette CA is not limited to the above-described configuration, and may have various configurations as long as the banknote bundles can be stored to be taken out. The number of storage sections is not limited to "6", and may be 5 or less or 7 or more.

In this embodiment, the paper sheet processing apparatuses 100A and 100B have the same configuration. Therefore, the following explanation will be given in detail using the paper sheet processing apparatus 100A as a representative, and the description of the paper sheet processing apparatus 100B will be omitted.

Figure 9:
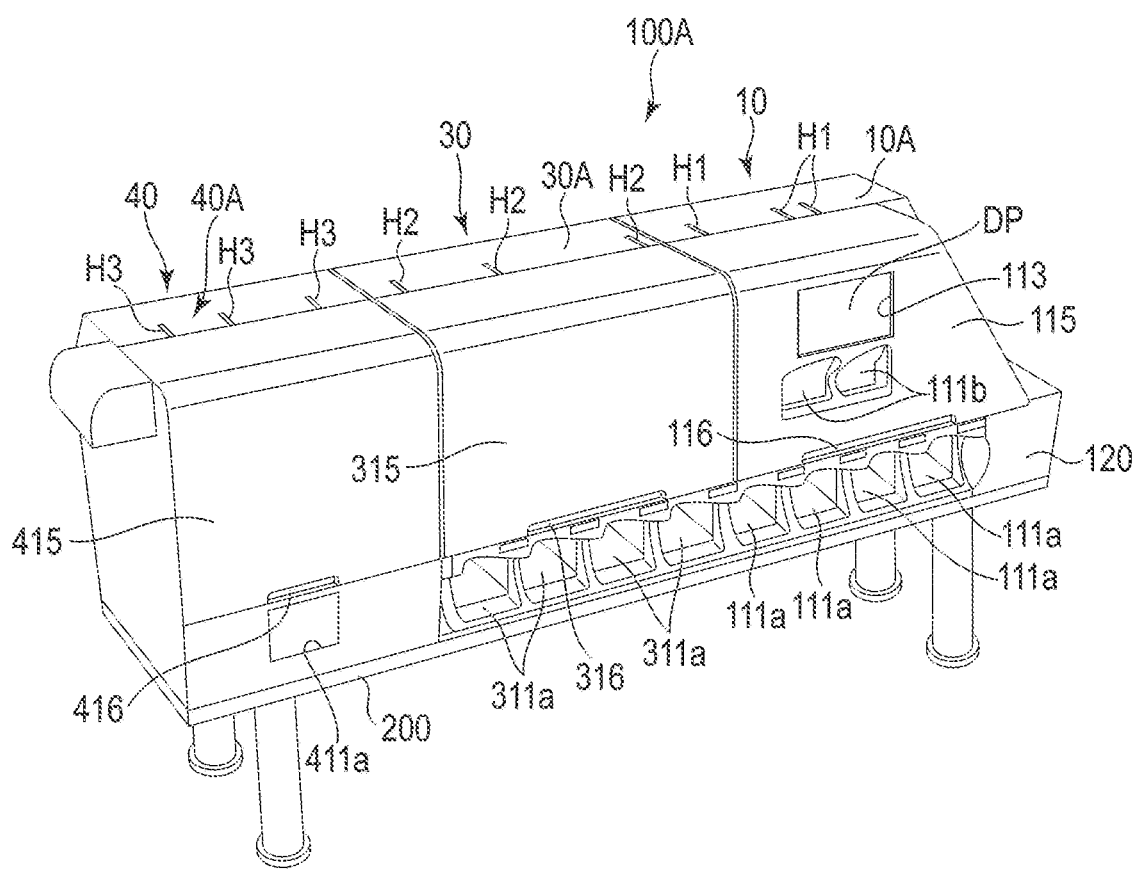
FIG. 9 is a perspective view illustrating the paper sheet processing apparatus in the paper sheet processing system.
Figure 10:
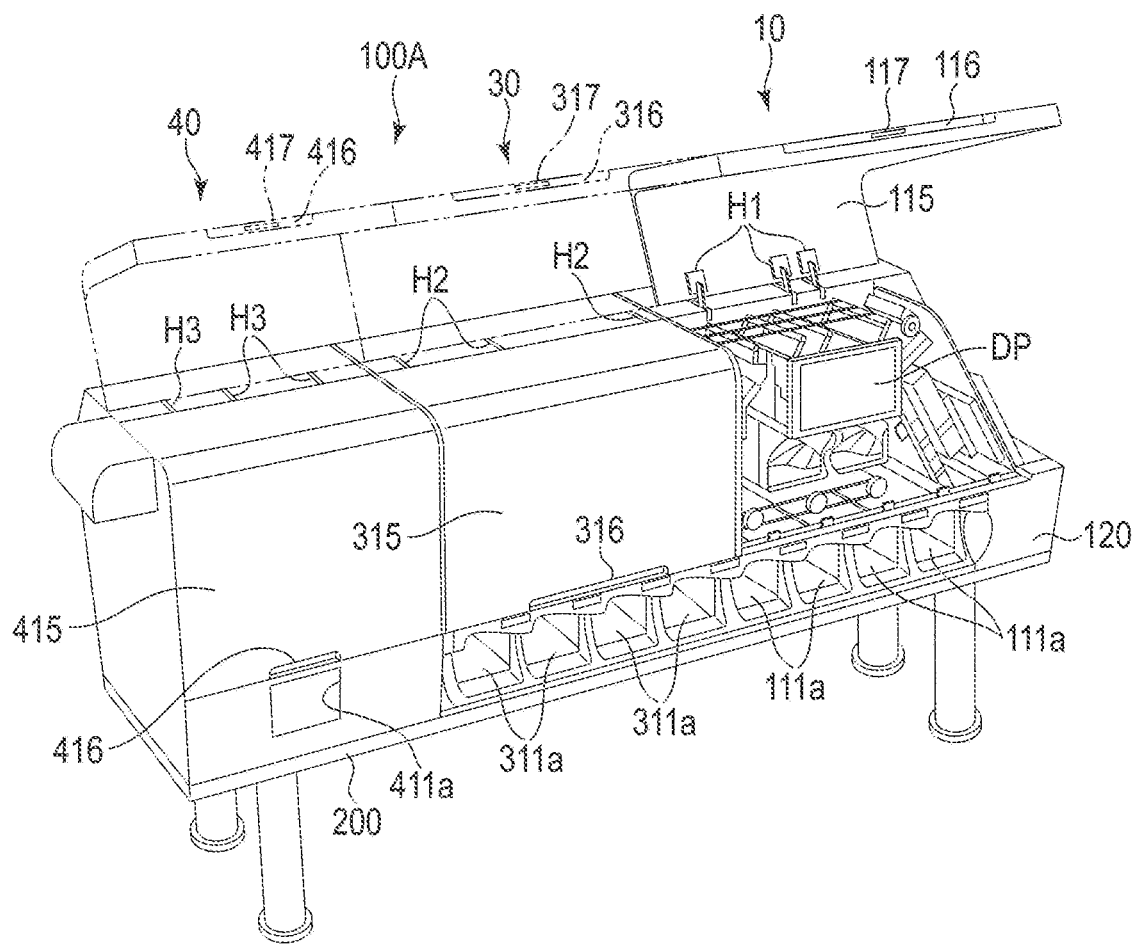
FIG. 10 is a perspective view of the paper sheet processing apparatus illustrating a state where one cover is opened.

FIG. 9 is a perspective view illustrating an outer appearance of the paper sheet processing apparatus. FIG. 10 is a perspective view of the paper sheet processing apparatus in a state where a cover is opened. As shown in FIG. 9, the paper sheet processing apparatus 100A comprises a main module 10, an alignment module 30, and a stacking and binding module 40 which is a stacking and binding device. These modules 10, 30, and 40 are arranged in a line, and electrically and mechanically connected to each other. In this embodiment, the paper sheet processing apparatus 100A is arranged on a table 200.

The main module 10, the alignment module 30, and the stacking and binding module 40 include a housing 10A, a housing 30A, and a housing 40A respectively. These housings 10A, 30A, and 40A are arranged in a line.

In the main module 10, a plurality of take-out ports (stacking ports) 111a are formed in the lower portion of the side wall of the housing 10A to take out the stacked banknotes. In the center of the side wall, a plurality of take-out ports (rejecting ports) 111b are provided to take out the stacked banknotes of damaged or rejected banknotes. Further, a window 113 is formed in the center of the side wall. The window 113 is provided at a position facing an operation panel (display) DP of the main module 10. The operation panel DP is configured by a display panel and a touch panel. The operation panel DP can be operated through the window 113. The operation panel DP can be viewed through the window 113.

Part of the housing 10A (herein, part of the side wall and part of a top wall continuing to the side wall) forms a cover (door) 115 which is openable and closable. The door 115 is rotatably supported by a plurality of hinges H1 which are provided in the top wall. In addition, a depressed portion 116 for hooking fingers is formed in the lower edge of the cover 115. A release button 117 (see FIG. 10) for releasing the locking is provided in the bottom of the depressed portion 116.

As illustrated in FIG. 10, when the locking is released by pressing the release button 117, the cover 115 rotates upward about the hinge H1 so as to be opened. When the cover 115 is opened, the inner structure (mechanism section) of the main module 10 is exposed, and an access to the inner structure is possible.

As shown in FIG. 9, a second cover (door) 120 which is openable and closable is provided at the lower portion of the side wall of the housing 10A. When the second cover 120 is opened, a foreign material collecting box is exposed and can be drawn out of the housing 10A.

In the alignment module 30, a plurality of take-out ports (stacking ports) 311a are formed in the lower portion of the side wall of the housing 30A to take out the stacked banknotes. Part of the housing 30A (herein, part of the side wall and part of a top wall continuing to the side wall) is configured by a cover (door) 315 which is openable and closable. The cover 315 is rotatably supported by a plurality of hinges H2 which are provided in the top wall. In addition, a depressed portion 316 for hooking fingers is formed in the lower edge of the cover 315. A release button 317 (see FIG. 10) for releasing the locking is provided in the bottom of the depressed portion 316.

As illustrated by a two-dot chain line in FIG. 10, when the locking is released by pressing the release button 317, the cover 315 rotates upward about the hinge H2 so as to be opened. When the cover 315 is opened, the inner structure (mechanism section) of the alignment module 30 is exposed, and an access to the inner structure is possible.

As illustrated in FIG. 9, in the stacking and binding module 40, a take-out port 411a is provided in the lower portion of the side wall of the housing 40A to take out a bound banknote bundle. Part of the housing 40A (herein, part of the side wall and part of a top wall continuing to the side wall) is configured by a cover (door) 415 which is openable and closable. The door 415 is rotatably supported by a plurality of hinges H3 which are provided in the top wall. In addition, a depressed portion 416 for hooking fingers is formed in the lower edge of the cover 415. A release button 417 (see FIG. 10) for releasing the locking is provided in the bottom of the depressed portion 416.

As illustrated by a two-dot chain line in FIG. 10, when the locking is released by pressing the release button 417, the cover 415 rotates upward about the hinge H3 so as to be opened. When the cover 415 is opened, the inner structure (mechanism section) of the stacking and binding module 40 is exposed, and an access to the inner structure is possible.

Figure 11:
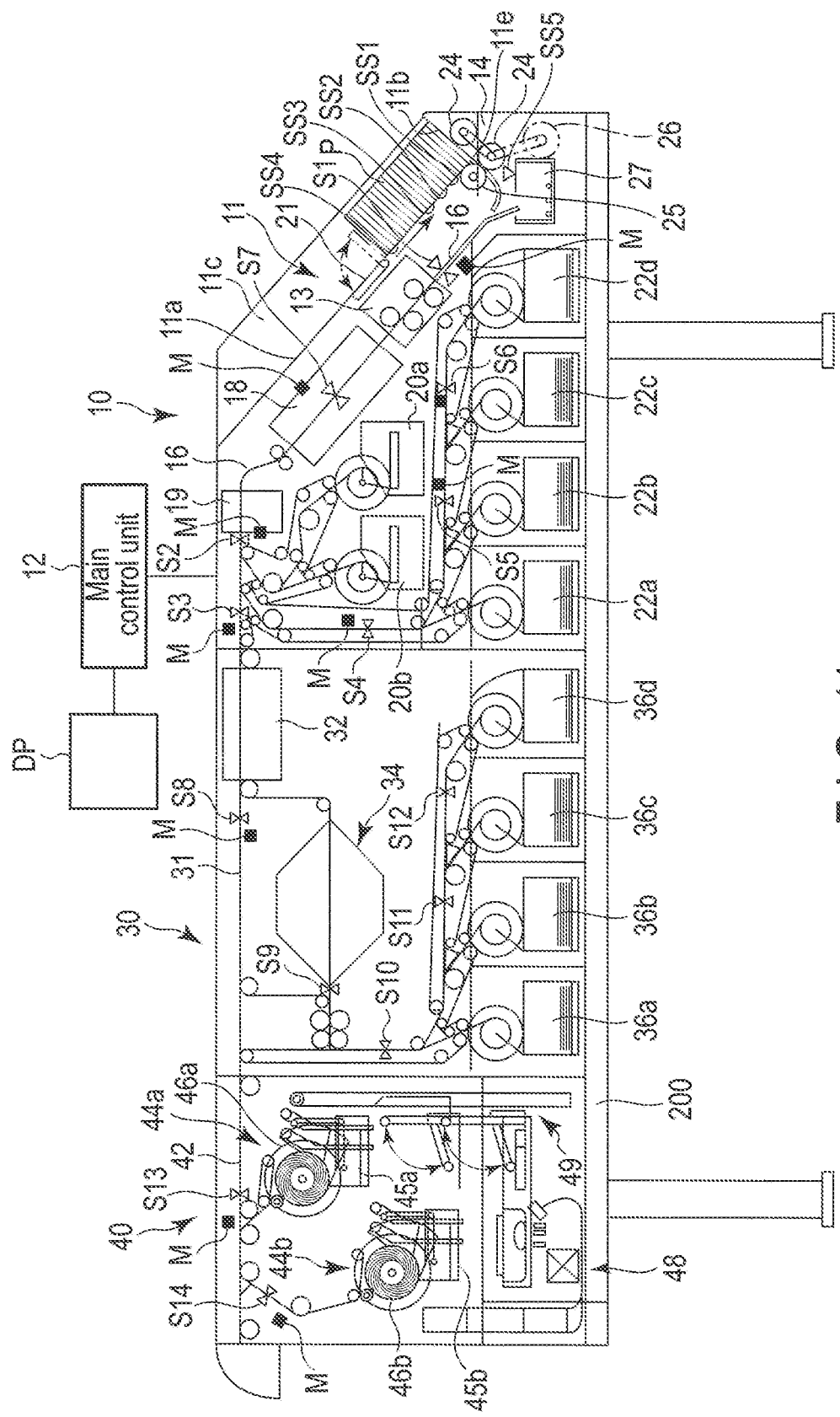
FIG. 11 is a cross-sectional view of the paper sheet processing apparatus schematically illustrating an inner structure of the paper sheet processing apparatus.

Next, the description will be given about an example of an inner structure (the mechanism section provided in the housings 10A, 30A, and 40A) of the paper sheet processing apparatus 100A. FIG. 11 is a cross-sectional view schematically illustrating an inner structure of the paper sheet processing apparatus. As illustrated in the drawing, the main module 10 includes a main control unit (main controller) 12 which controls the operations of the main module 10 and the entire device and the operation panel DP connected to the main control unit 12. For example, the operation panel DP is configured by a display panel and a touch panel. Various types of operation commands can be input by touch, and various types of information can be displayed. The main module 10 includes a supply device 11 which is placed in a state where a number of banknotes P are stacked, a pick-up mechanism 14 which takes the banknotes P one by one out of the supply device 11, and a conveyance path 16 through which the banknote P taken out by the pick-up mechanism 14 is carried. In the conveyance path 16, there are provided a plurality of conveyance rollers to interpose the conveyance path 16 to drive and guide a plurality of endless conveyance belts (not illustrated) and a plurality of conveyance rollers which form a conveyance mechanism. The taken-out banknote P is carried while being interposed by the conveyance belts.

The supply device 11 comprises a support surface 11a, extending inclined at an arbitrary angle to the vertical direction, mounting surface 11b extending substantially perpendicular to the support surface 11a, and a pair of guide walls 11c set up along the opposite sides of the mounting surface 11b. A take-out port through which the banknotes P are introduced into the apparatus is formed at the boundary between the support surface 11a and mounting surface 11b.

A plurality (for example, 2,000 or more) of banknotes P can be stacked and mounted in the supply device 11. The lowermost one of the stacked banknotes P is placed on the mounting surface lib, and the banknotes P are slantingly mounted on the mounting surface lib in such a manner that, for example, their longer side edges are arranged along the support surface 11a. The stacked banknotes P are sequentially taken into the apparatus through a take-out port 11e one by one from the lowermost banknote P by the pick-up mechanism 14.

The supply device 11 comprises a backup plate 21 configured to move the stacked bills P to the pick-up side or toward the mounting surface 11b. The backup plate 21 is movable along the support surface 11a so that it can be accommodated in the support surface 11a.

The pick-up mechanism 14 comprises a plurality of pick-up rollers (take-out roller) 24 which is provided to abut the banknote P on the mounting surface 11b, a separating roller 25 which are arranged in rolling contact with the pick-up rollers 24 on the take-out port side, and a drive motor 26 which rotates the pick-up rollers 24 at a predetermined speed.

As the pick-up rollers 24 rotate, they pick up the lowermost banknote P and deliver it to the conveyance path 16. At that time, the second and subsequent banknotes P are separated from the picked-up banknote by the separating roller 25. In this way, the banknotes P are picked up out one by one from the supply device 11, and delivered to the conveyance path 16.

A conveyance pitch correction device 13 which corrects a conveyance pitch of the banknotes P, an inspection device 18 which inspects the conveyance-pitch-corrected banknotes P one by one, and a barcode reader 19 are disposed along the conveyance path 16. The inspection device 18 is located above the take-out port of the supply device 11 with respect to the vertical direction. The inspection device 18 detects the denomination, shape, thickness, side (obverse or reverse), authenticity, fitness, double pick-up, etc., of the banknotes P. Herein, a soundness detection is to detect a fit banknote for currency and an unfit banknote for currency due to stains and damages. For example, in a case where the batch card is used, the barcode reader 19 reads the batch card passed through the inspection device 18 or the barcode attached to a casino ticket, and sends the read information to the main control unit 12.

The conveyance path 16 extends to the lower side at one end from the pick-up mechanism 14 and the take-out port, and extends from down to up obliquely with respect to the vertical direction up to the inspection device 18. Further, the conveyance path 16 is linked to the alignment module 30 to be described below. A discharge port is formed in the lowermost portion of the conveyance path 16. A foreign material collecting box 27 is provided on the lower side of the discharge portion. A foreign material falling along the conveyance path 16 is discharged from the discharge port and collected in the collecting box 27. As described above, the foreign material collecting box 27 is provided to be pulled to the outside of the housing 10A by opening the second cover 120 of the housing 10A.

In the main module 10, two reject portions 20a and 20b are provided along the conveyance path 16. In addition, a plurality of stacking storages 22a, 22b, 22c, and 22d containing the stacked banknotes are disposed in parallel. The banknote P passed through the inspection device 18 is classified into a reject banknote and a processing banknote by a gate (a classifying device; not illustrated). The reject banknote means a banknote which is determined as a counterfeit banknote by the inspection device 18, or a banknote which is determined as an undeterminable banknote due to folding, breaking, skewing, and two overlapped sheets. The reject banknote is classified into the reject portion 20a or 20b and stacked. The reject portions 20a and 20b are disposed at positions facing the take-out ports 111b.

The reject banknotes stacked in the reject portion 20a or 20b, except the counterfeit banknotes, are set in the supply device 11 again, and taken into again or counted in data manually. The inspection result such as a processing amount of money and the number of banknotes obtained by the inspection device 18 is sent to and stored in the main control unit 12, and displayed in the operation panel DP.

The processing banknote means that the banknote P is a genuine and correct banknote or a genuine and damaged banknote as a result of the determination of the inspection device 18. The processing banknotes are set to and stacked in the stacking storages 22a to 22d. For example, the processing banknote is classified according to banknote denomination and stacked in the corresponding one of the stacking storages 22a to 22d. In addition, the damaged banknotes are collected and stacked in one stacking storage. The stacking storages 22a to 22d are disposed at positions facing the take-out port 111a.

In a case where the batch card is used, the batch card passes through the inspection device 18 and the barcode reader 19, and is sent to the reject portion 20a or 20b, and stacked therein together with the reject banknote.

The main module 10 comprises a drive mechanism which drives the pick-up mechanism 14, the inspection device 18, a conveyance mechanism, and a power source. Further, the main module 10 comprises a plurality of optical sensor S1 to S6 which are provided in several places of the conveyance path 16, and an optical sensor S7 which is provided in the conveyance path in the inspection device 18. The optical sensors each include a light-emitting device and a light-receiving device which receives a detected light emitted from the light-emitting device, and detect the banknote passing between the light-emitting device and the light-receiving device. In addition, the main module 10 comprises a plurality of optical sensors SS1 to SS4 which are provided in several places of the supply device 11. The optical sensors SS1 to SS4 each detect whether there is a banknote in the supply device 11, and detect whether there are remaining banknotes in the entire supply device 11. Further, the main module 10 comprises an optical sensor SS5 which detects whether there is a foreign material in the foreign material collecting box 27. In the vicinity of the optical sensors S1 to S7, and SS1 to SS5, marks M, for example, a colored seal and a reflecting plate may be provided to indicate the installation positions of these optical sensors. In a case where the mark M is provided in the vicinity of the optical sensor, the processing robot CR recognizes the mark M as a sign, and can easily detect the installation position of the optical sensor. The processing robot CR can easily position the hand 54 with respect to any one of the optical sensors and a processing target.

The alignment module 30 comprises a conveyance path 31 which carries the banknote P sent from the main module 10, an arranging mechanism 32 which is provided on the upstream side of the conveyance path 31, an inversing device 34 which is provided on the downstream side of the arranging mechanism 32 along the conveyance path 31, and a plurality of stacking storages 36a, 36b, 36c, and 36d which are disposed in parallel along the conveyance path 31. The stacking storages 36a, 36b, 36c, and 36d are disposed at positions corresponding to the take-out ports 311a of the housing 30A. Further, the alignment module 30 comprises a plurality of optical sensors S8 to S11 which are provided at several places of the conveyance path 31. The optical sensors each include a light-emitting device and a light-receiving device which receives a detected light emitted from the light-emitting device, and detect the banknote passing between the light-emitting device and the light-receiving device. In addition, the mark M (for example, a colored seal, a reflecting plate) may be provided in the vicinity of each of optical sensors S8 to S11 to indicate the installation positions of these optical sensors.

The banknote P sent out of the arranging mechanism 32 or the aligned banknote P sent out of the inversing device 34 is sent to a stacking and binding module 40 through the conveyance path 31, or sent to and stacked in any one of the stacking storages 36a to 36d. The stacking storages 36a to 36d of the alignment module 30 may be used as stacking storages which stack the banknotes according to banknote kind, or may be used as a reject storage or a damaged banknote storage which stacks the reject banknotes or the damaged banknotes taken out of the main module 10.

On the other hand, in a case where a binding process of the banknote is set, a correct banknote or a damaged banknote taken out of the main module 10 or a correct banknote or a damaged banknote taken out of the alignment module 30 is sent to the stacking and binding module 40 through the conveyance path 31 of the alignment module 30, and stacked and bound by a predetermined number of notes.

The stacking and binding module 40 comprises a conveyance path 42 which is interlocked to the conveyance path 31 of the alignment module 30, a first stacking device 44a and a second stacking device 44b which stack the banknote sent through the conveyance path 42 by a predetermined number of notes, a binding device 48 which binds the banknote bundle of a predetermined number (for example, 100) of notes stacked by these stacking devices using a band, and a conveyance mechanism 49 which carries the banknote bundle stacked by the first stacking device 44a and the banknote bundle stacked by the second stacking device 44b to the binding device 48. Further, there is provided a discharge device (not illustrated) which receives and stacks the banknote bundle bound by the binding device 48 in the lower side of the binding device 48.

The first stacking device 44a and the second stacking device 44b are disposed to be deviated up and down and right and left. The second stacking device 44b is disposed to be deviated in a downward direction inclined, for example, by about 10 to 80 degrees with respect to the first stacking device 44a. Part of the second stacking device 44b is overlapped with the first stacking device 44a in the vertical direction. The binding device 48 is disposed on the lower side of the second stacking device 44b. The first and second stacking devices 44a and 44b each include temporary stacking devices 45a and 45b, and impeller stacking devices 46a and 46b which stack a predetermined number of sent banknotes P in the temporary stacking devices 45a and 45b one by one.

The stacking and binding module 40 comprises a plurality of optical sensors S13 and S14 which are provided at several places of the conveyance path 42. The optical sensors each include a light-emitting device and a light-receiving device which receives a detected light emitted from the light-emitting device, and detect the banknote passing between the light-emitting device and the light-receiving device. In addition, the mark M (for example, a colored seal, a reflecting plate) may be provided in the vicinity of each of the optical sensors S13 and S14 to indicate the installation positions of these optical sensors.

FIG. 12 is a block diagram schematically illustrating a configuration of the paper sheet processing apparatus and the processing robot. As illustrated in FIG. 12, the main module 10 of the paper sheet processing apparatus 100A comprises the main control unit 12 which controls the operations of the entire device including the main module and other modules. The main control unit (main controller) 12 comprises a CPU 12a which controls the operations of the respective modules and calculates an efficiency of the operation, a memory 12b which stores various types of data, control programs, and management information, and a communication module 12c which performs data communication with the processing robot CR. The operation panel DP is connected to the main control unit 12. The plurality of optical sensors S1 to S7, and SS1 to SS5 each are connected to the main control unit 12, and send a detection output of the light-receiving device to the main control unit 12. The main module 10 further comprises a driver 28 which drives the motor 26 of the pick-up mechanism 14. The driver 28 is controlled by the main control unit 12. The inspection device 18 is connected to the main control unit 12, and sends an inspection result of the banknote to the main control unit 12.

The alignment module 30 and the stacking and binding module 40 each include sub control units 31a and 41a which control the operations of the respective modules. These sub control units are connected to the main control unit 12 of the main module 10 through an interface and a cable (not illustrated) by means of LAN. The main control unit 12 is connected to a host computer (not illustrated), transfers information with respect to the host computer, and arranges the information.

The plurality of optical sensors S8 to S12 of the alignment module 30 each are connected to the sub control unit 31a, and send a detection signal or a detection output to the sub control unit 31a. A mechanism unit including the motor is connected to the sub control unit 31a, and is controlled by the sub control unit 31a.

The stacking and binding module 40 comprises a printer to perform printing on a binding band, a binding module, a stacking device, a drive mechanism, and the optical sensors S13 and S14. These components are controlled by the sub control unit 41a. In addition, each of the optical sensors S13 and S14 sends a detection signal or a detection output to the sub control unit 41a.

The main control unit 12 comprises a process table TB which is stored in the memory 12b. As illustrated in FIG. 13, the process table TB stores a processing content (job description) to command the processing robot CR, a processing target portion, a processing factor, and a processing code in association with one another. For example, the process table TB includes banknote loading, rejected banknote collecting, jam releasing, cleaning, foreign material discarding, and feeder gap adjustment as a processing content. The processing codes 001 to 011 are assigned to the respective processes. The process table TB stores a processing device A or B, discharge ports A, B, and C, jammed portions A to F, cleaning target sensors A to F, a cleaning target inspection device, a foreign material collecting box, and a cap adjustment portion as target portions of each process. In addition, as the processing factor corresponding to the processing content, there are included a residual banknote reduction, a batch card detection, a jam detection, a sensor output reduction, a rejection rate increase, a foreign material detection, and a jam rate increase. The main control unit 12 detects an operation state of the processing device based on detected signals from the plurality of optical sensors. Then, the main control unit 12 transmits the detected operation information from the communication module 12c to the processing robot CR frequently or periodically. FIG. 14 illustrates an example of the operation information. The operation information includes, for example, device working, suspending, cleaning, device operating time, processing amount, rejected banknote amount, stacked amount, and residual banknote amount (residual amount) of the supply device.

On the other hand, as illustrated in FIG. 12, the processing robot CR includes a CPU 80 which forms the control unit (controller), a memory 82 which stores various types of management information and process programs, a mechanism section 83 which includes a motor to drive the wheel of the dolly 50, the robot arm 52, and a plurality of motors to drive the hand 54, a driver 84 which drives the mechanism section 83, a camera 85 which serves as the electronic eye, a position sensor 86 which is provided in the dolly 50, and a communication module 87 which performs data communication with the paper sheet processing apparatuses 100A and 100B. The CPU 80 is connected to the driver 84, the camera 85, the communication module 87, and the position sensor 86, and controls these components. In addition, the CPU 80 has a function of learning data stored in the memory 82 to calculate an efficient processing operation.

According to the paper sheet processing system 1 configured as described above, the main control unit 12 of the paper sheet processing apparatuses 100A and 100B frequently detects the operation state of the processing device based on the detected signals from various types of sensors, and transmits various types of operation information (see FIG. 14) corresponding to the detected operation state to the processing robot CR frequently or periodically. The processing robot CR receives the transmitted processing information by the communication module 87, and sequentially stores the received operation information in the memory 82. In addition, in a case where the main control unit 12 of the processing devices 100A and 100B detects any one of the processing factors defined in the process table TB based on the detected signals from various sensors, the main control unit 12 selects a processing content, a target portion, and a processing code corresponding to the processing factor from the process table TB, and transmits the selected data to the processing robot CR as a maintenance process command. When receiving the process command, the control unit (the CPU 80) of the processing robot CR calculates an optimal timing for the processing, for example, a time zone of less processing amount during suspension based on the operation information of the processing device. Then, the processing robot CR executes the processing content corresponding to the process command at the calculated optimal timing.

In the following, the description will be given about examples of the processing operation of the processing robot CR.

1) Banknote Loading

In a case where the residual reduction of the banknotes or no banknotes in the supply device 11 is detected at the time of the paper sheet processing apparatuses 100A and 100B start to operate or during the operation, the paper sheet processing apparatus 100A or 100B reads the processing code 001 and the banknote loading from the process table TB, and transmits the read data to the processing robot CR as a process command. When the process command is received, the processing robot CR selects an optimal loading timing, and an optimal processing device 100A or 100B based on the operation information of the processing device. At the optimal loading timing, the processing robot CR moves closer to the storage cassette CA, reads the barcode BC attached to the display plate 78 of the storage cassette CA by the electronic eye (the camera 85), and acquires information of the banknote bundle G which is stored in the storage cassette CA. The processing robot CR selects an optimal number of banknotes to the paper sheet processing apparatus and a banknote bundle G of the denomination of the banknote based on the acquired information of the banknote bundle G and the operation information of the processing device. Further, the processing robot CR selects any one of the paper sheet processing apparatus 100A and 100B, which is suitable to the loading timing based on the operation information.

Subsequently, as illustrated in FIG. 8, the processing robot CR moves the hand 54 to the upper side of the storage section in which the selected banknote bundle G is stored. Further, the banknote bundle G and the batch card B are held by inserting the finger 56 to the storage section. The processing robot CR takes out the storage section in a state where the banknote bundle G and the batch card B are held, and moves closer to the supply device 11 of the selected paper sheet processing apparatus 100A or 100B. Further, the processing robot CR loads the banknote bundle G and the batch card B to the supply device 11 by the robot arm 52 and the hand 54 while checking the loading position using the camera 85.

After the loading is completed, the processing robot CR notifies the loading completion to the paper sheet processing apparatuses 100A and 100B, and stores the information of the loaded banknote bundle G and a loading history to the memory 82. With this configuration, the loading process is completed.

Further, the processing robot CR estimates the residual reduction of the loaded banknote based on the operation information of the paper sheet processing apparatus, and may perform a banknote loading process in advance based on its own determination.

2) Rejected Banknote Collecting

When the batch card B is detected by the inspection device 18 and the rejected banknote and the batch card B are stacked in the reject portion 20a, the paper sheet processing apparatuses 100A and 100B read the processing code 002, a rejected banknote collecting, and a target portion which correspond to the batch card from the process table TB, and transmits the read data to the processing robot CR as a process command. When the process command is received, the processing robot CR selects an optimal process timing based on the operation information of the paper sheet processing apparatus. Further, the rejected banknote collecting is a process which can be performed without stopping the paper sheet processing apparatus. Therefore, the processing robot CR starts the processing operation at a timing when the process command is received.

The processing robot CR moves closer to the paper sheet processing apparatus (processing target), and detects the position of the take-out port (rejecting port) 111b. (processing target) by the electronic eye (the camera 85). Subsequently, the processing robot CR inserts the hand 54 to the take-out port 111b by the robot arm 52, and holds the rejected banknote and the batch card B by the hand 54. Further, the processing robot CR takes the hand 54 out of the take-out port 111b by the robot arm 52, and collects the rejected banknote and the batch card B.

Subsequently, the processing robot CR moves closer to a predetermined storage device (for example, the storage shelf), and places the rejected banknote and the batch card collected by the robot arm 52 onto the storage shelf. Therefore, the collecting is ended, and the processing robot CR notifies the collecting completion to the paper sheet processing apparatus, and stores a collecting amount and a collecting history in the memory 82 as management information.

Further, a storage section empty in the storage cassette CA may be used as a storage device which stores the collected rejected banknote and the collected batch card. The collecting may be performed such that the rejected banknote and the batch card collected by the processing robot CR are loaded onto the supply device 11 of the paper sheet processing apparatus, and performs the inspection and the counting again by the paper sheet processing apparatus.

3) Cleaning Process 1

As an example of the processing operation, a process of cleaning will be described in which the optical sensors of the paper sheet processing apparatuses 100A and 100B are cleansed by the processing robot CR.

Figure 15:
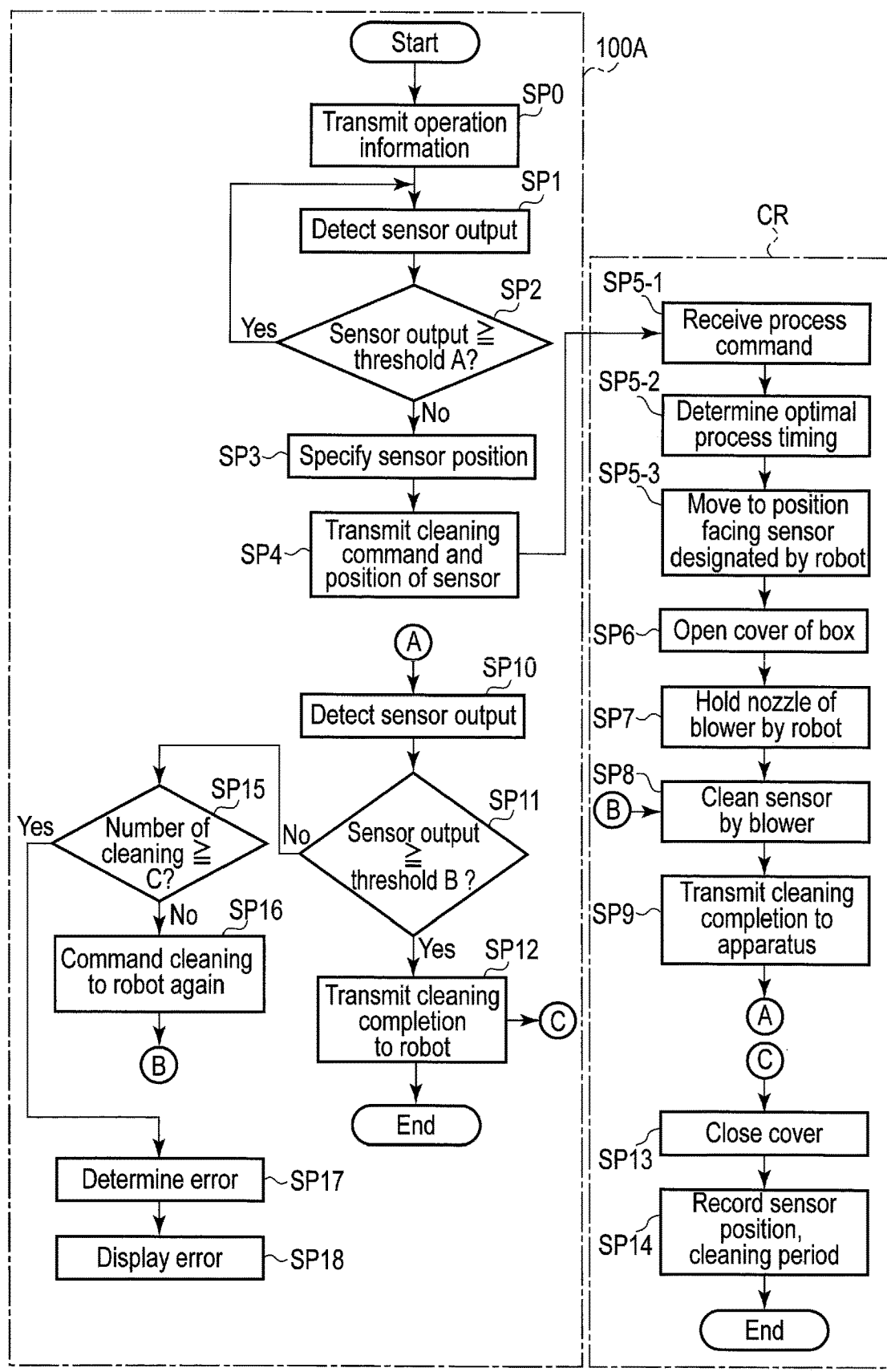
FIG. 15 is a flowchart illustrating an example of a cleaning operation in the paper sheet processing system.

FIG. 15 is a flowchart illustrating an example of a cleaning operation. As illustrated in FIG. 15, the main control unit 12 of the paper sheet processing apparatus 100A transmits the operation information (see FIG. 14) of the processing device to the processing robot CR frequently or periodically (SP0). For example, the main control unit 12 detects sensor outputs (the detection signal from the light-receiving device) of the plurality of optical sensors S1 to S14 at the time of stopping the process (SP1), and determines whether the sensor output is larger than a predetermined threshold A (SP2). In a case where an optical sensor having a sensor output lower than the threshold A is detected, the main control unit 12 determines that the optical sensor is stained, and specifies the optical sensor as the optical sensor (target portion) of a cleaning target (SP3). Subsequently, the main control unit 12 reads the processing code 005, cleaning, a target sensor position corresponding to the sensor output reduction from the process table TB, and transmits the read data to the processing robot CR as a process command. The position of the specified optical sensor and a cleaning command to clean the optical sensor are transmitted to the processing robot CR (SP4).

Figure 16:
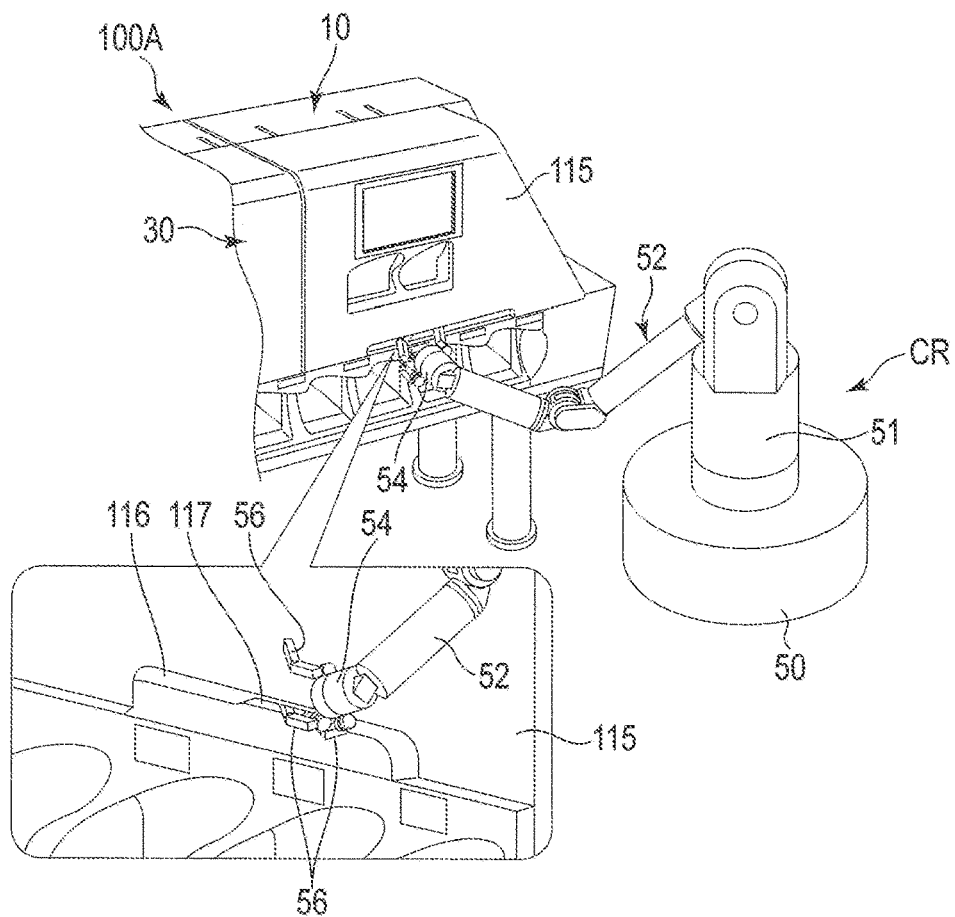
FIG. 16 is a perspective view of the paper sheet processing system illustrating a first procedure in the cleaning operation.
Figure 17:
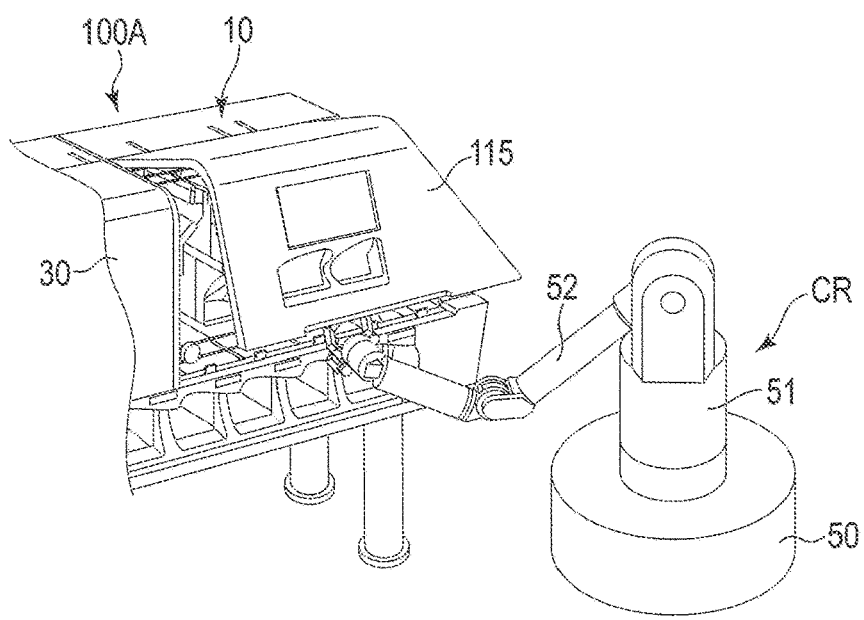
FIG. 17 is a perspective view of the paper sheet processing system illustrating another first procedure in the cleaning operation.

When receiving the cleaning command (SP5-1), the processing robot CR determines an optimal process timing based on the operation information of the paper sheet processing apparatus (SP5-2). When it comes to an optimal timing, the processing robot CR runs the dolly 50 to move to a position facing the optical sensor which is a cleaning target (SP5-3). In a case where the specified optical sensor is an optical sensor in the main module 10 for example, the processing robot CR moves to a position (near position) facing the cover 115 of the main module 10. Subsequently, the processing robot CR opens the cover 115 of the main module 10 (SP6). At that time, as illustrated in FIG. 16, the processing robot CR first suspends the finger 56 of the hand 54 to the depressed portion 116 of the cover 115. At the same time, the processing robot CR presses the release button 117 by one or two fingers 56 to release the locking of the cover 115. As illustrated in FIG. 17, the processing robot CR rotates the robot arm 52 upward in this state so as to open the cover 115.

Figure 18:
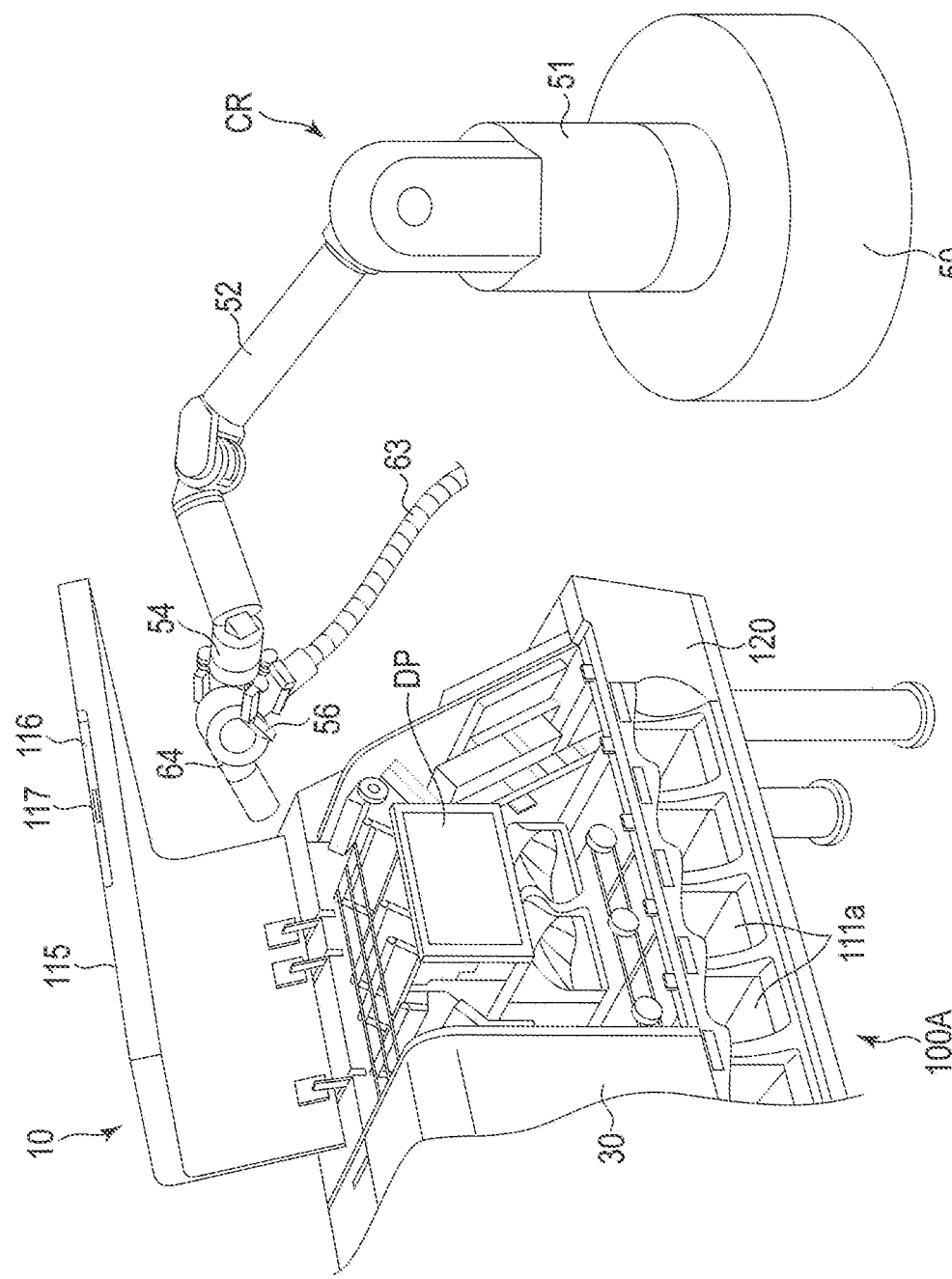
FIG. 18 is a perspective view of the paper sheet processing system illustrating another first procedure in the cleaning operation.

After the cover 115 is opened, the processing robot CR moves to an installation place of the blower device B1, and holds the injection nozzle 64 by the hand 54 (SP7). Subsequently, the processing robot CR moves to a position (near position) facing the main module 10 in a state where the injection nozzle 64 is held. The processing robot CR detects the optical sensor of the processing target by the electronic eye (the camera 85), and recognizes a position of the optical sensor. At that time, the electronic eye can detect the position of the target optical sensor using the mark M as a sign. Next, as illustrated in FIG. 18, the processing robot CR drives the robot arm 52 and the hand 54, and turns the injection nozzle 64 to face the target optical sensor and moves the injection nozzle closer to the optical sensor. Then, the processing robot CR draws the lever of the injection nozzle 64 using the finger 56 to blow a compressed air toward the optical sensor from the injection nozzle 64. The optical sensor is cleaned by blowing off the compressed air to sweep dust, paper dust, and dirt attached to the optical sensor (SP8).

In a case where the stained optical sensor (that is, the optical sensor of which the sensor output is lower than the threshold) is detected, there is a possibility that the other optical sensors in the same module of the stained optical sensor are also stained. Therefore, after cleaning the optical sensor of the processing target, the processing robot CR may clean the other optical sensors positioned near the optical sensor, or all the other optical sensors in the main module 10.

As illustrated in FIG. 15, after the cleaning is completed, the processing robot CR notifies the cleaning completion to the main control unit 12 of the paper sheet processing apparatus 100A (SP9). Accordingly, the main control unit 12 detects the sensor output of the optical sensor (SP10), and determines whether the sensor output is larger than a predetermined threshold B (>A) (SP11). In a case where the sensor output is larger than the threshold B, the main control unit 12 determines that the optical sensor is normally cleansed, and notifies the cleaning completion to the processing robot CR (SP12). When being notified of the completion, the processing robot CR closes the cover 115 (SP13). Thereafter, the processing robot CR returns the injection nozzle 64 to the installation place of the blower device B1. In addition, the processing robot CR stores information on the optical sensor of the cleaned processing target and a cleaning period (cleaning history) in the memory 82 (SP14).

On the other hand, in a case where it is determined in SP11 that the detected sensor output is lower than the threshold B, the main control unit 12 determines whether the number of times of cleaning is larger than a predetermined number C (SP15). In a case where the number of times of cleaning is smaller than the predetermined number, the main control unit 12 transmits the cleaning command to the processing robot CR again. Accordingly, the processing robot CR performs the processes of SP8 and SP9 again, and cleans the optical sensor again.

In this way, the cleaning is repeated until the sensor output of the optical sensor exceeds the threshold B, and the cleaning is completed.

In addition, in a case where it is determined in SP15 that the number of times of cleaning is larger than the predetermined number C, the main control unit 12 determines an error (SP17), and displays an error in the operation panel DP (SP18). Then, the cleaning process is ended.

After the cleaning process is performed in plural times, the CPU 80 of the processing robot CR learns the management information stored in the memory 82 (for example, a cleaning-target optical sensor and a cleaning timing), and may determine an optical sensor which is easily stained or an optical sensor which is hardly stained. In addition, an optimal cleaning timing can be calculated for each optical sensor. The processing robot CR may perform a process which is performed only on an easily-stained optical sensor in the module at the time of next cleaning process based on the calculated data. Alternatively, the processing robot CR may perform a process which cleans the optical sensor in advance before receiving the cleaning command from the paper sheet processing apparatus based on an optimal cleaning timing. With this configuration, it is possible to improve an efficiency of the cleaning process.

Further, the cleaning process can be similarly performed even on the optical sensor in the alignment module 30 and the optical sensor in the stacking and binding module 40.

In the cleaning process, when the compressed air is blown to the optical sensor from the injection nozzle, and simultaneously an ambient air is absorbed by the suction nozzle of the vacuum device, the optical sensor can be effectively cleaned. In other words, dirt and dust blown off by the compressed air are absorbed by the suction nozzle, so that it can prevent dust and dirt from being attached to the optical sensor again.

In a case where the cleaning process is performed, two processing robots CR and CR2 having the same configuration as that of the described-above processing robot CR are disposed as illustrated in FIG. 19. The injection nozzle 64 may be held by one processing robot CR to inject the compressed air toward the optical sensor. The suction nozzle 74 may be held by the other processing robot CR2 to absorb the ambient air around the optical sensor by the suction nozzle. Alternatively, two robot arms 52 may be commonly provided in the dolly 50, and the hand 54 may be provided at the tip end of each robot arm.

4) Cleaning Process 2

The main control unit 12 of the paper sheet processing apparatuses 100A and 100B counts the number of rejected banknotes, and stores the counted number in the memory 12b. The main control unit 12 compares the counted number and a predetermined threshold. In a case where the counted number exceeds the predetermined threshold, a rejection rate of the banknote of the inspection device 18 is increased (that is, it is determined that the inspection device 18 is stated). In this case, the main control unit 12 reads the processing code 007, cleaning, a target inspection device corresponding to an increase of the rejection rate from the process table TB, and transmits the data to the processing robot CR as a process command.

When receiving the cleaning command, the processing robot CR determines an optimal process timing based on the operation information of the processing device. When it comes to an execution timing, the processing robot CR cleans the inspection device 18 through almost the same process as the cleaning process 1. In other words, after opening the cover 115 of the main module 10, the processing robot CR detects the inspection device 18 by the electronic eye (the camera 85), and recognizes the position of the inspection device 18. Next, the processing robot CR blows a compressed air toward the inspection device 18 from the injection nozzle 64. The inspection device 18 is cleansed by blowing off the compressed air to sweep dust, paper dust, and dirt attached to the inspection device 18. After closing the cover 115, the processing robot CR notifies the cleaning completion to the paper sheet processing apparatus, and stores the cleaning history to the memory 82 as the management information. Then, the cleaning process of the processing robot CR is ended.

5) Foreign Material Discarding Process

Figure 20:
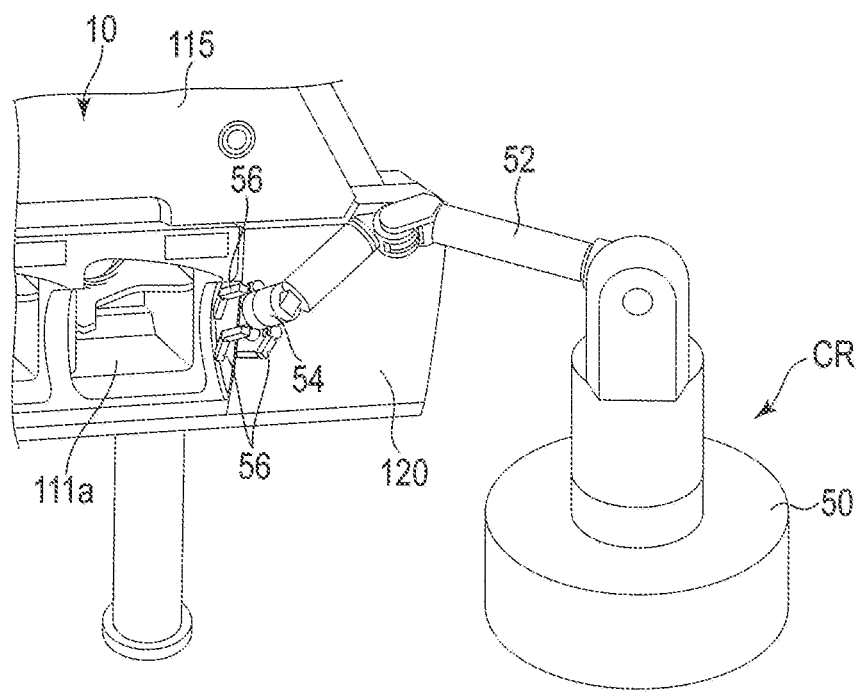
FIG. 20 is a perspective view of the paper sheet processing system illustrating the first procedure in a foreign material eliminating operation.
Figure 21:
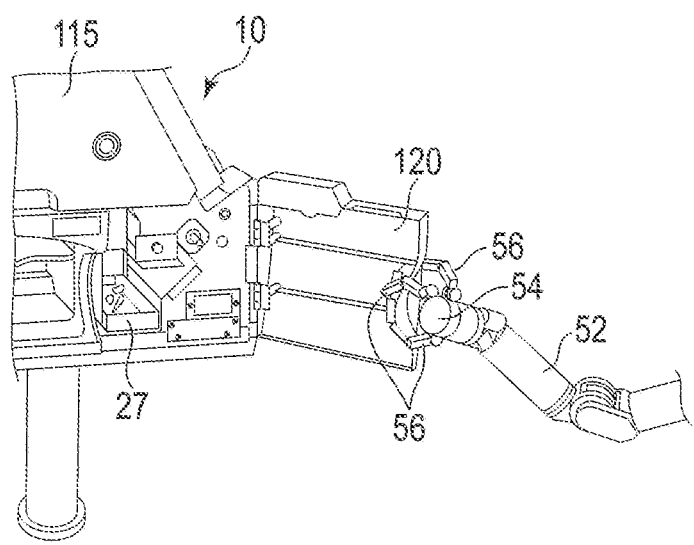
FIG. 21 is a perspective view of the paper sheet processing system illustrating another first procedure in the foreign material eliminating operation.
Figure 22:
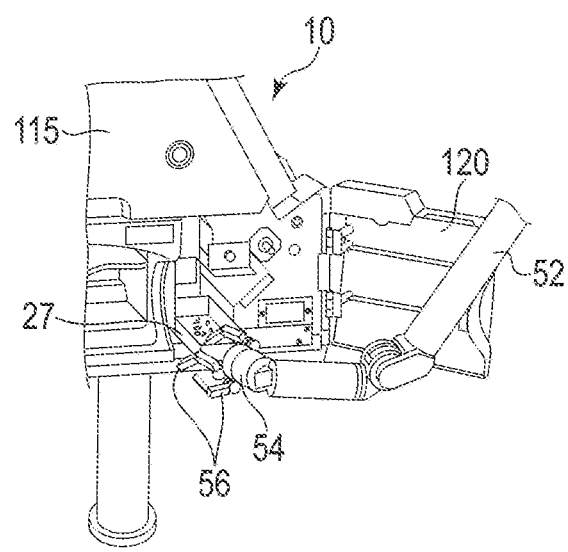
FIG. 22 is a perspective view of the paper sheet processing system illustrating another first procedure in the foreign material eliminating operation.

FIGS. 20, 21, and 22 illustrate the operations of a foreign material discarding process of the processing robot CR. When a foreign material is detected in the foreign material collecting box 27 by the optical sensor SS5 of the main module 10 in any one of the paper sheet processing apparatuses 100A and 100B, the main control unit 12 reads the processing code 008, a foreign material discard, a target foreign material collecting box corresponding to the foreign material detection from the process table TB, and transmits the data to the processing robot CR as a process command.

When receiving a foreign material discarding command, the processing robot CR determines an optimal process timing based on the operation information of the processing device. When it comes to an execution timing, the processing robot CR moves to the near position of the second cover 120 of the main module 10 as illustrated in FIG. 20. After moving, the processing robot CR suspends the hand 54 to the depressed portion for hooking fingers of the second cover 120, and rotates the robot arm 52. With this configuration, as illustrated in FIG. 21, the processing robot CR opens the second cover 120, so that the foreign material collecting box 27 is drawable.

As illustrated in FIG. 22, subsequently, the processing robot CR holds the foreign material collecting box 27 by the hand 54, and rotates the robot arm 52, so that the held foreign material collecting box 27 is drawn out of the main module 10. The processing robot CR moves closer to an arbitrary discard place in a state where the foreign material collecting box 27 is held. Then, the processing robot CR inverts the foreign material collecting box 27 by rotating the robot arm 52 so as to discard the foreign material therein to a discard place.

Thereafter, the processing robot CR returns the foreign material collecting box 27 to a position facing the main module 10 in the held state, and inserts the foreign material collecting box 27 to a predetermined position in the main module 10. After inserting, the processing robot CR releases the foreign material collecting box 27, and closes the second cover 120. With this configuration, the foreign material discarding process is ended. After the foreign material discarding process is ended, the processing robot CR transmits a process end signal to the main control unit 12 of the paper sheet processing apparatus 100A. In addition, the CPU 80 of the processing robot CR stores a processing history of the foreign material discarding in the memory 82 as the management information.

6) Jam Releasing Process

The main control unit 12 of the paper sheet processing apparatuses 100A and 100B frequently detects the outputs of the optical sensors S1 to S14 to monitor that the banknote passes through the conveyance paths 16, 31, and 42. In a case where the main control unit 12 detects that the banknote does not pass or stays according to the outputs of the optical sensors S1 to S14, the main control unit 12 determines that banknote jamming occurs. In this case, the main control unit 12 stops the operation of the processing device, and displays the jamming and an image of the jammed portion in the operation panel DP. In addition, the main control unit 12 reads the processing code 003 or 004, a jam releasing process, and the jammed portion corresponding to the jamming detection from the process table TB, and transmits the data to the processing robot CR as a process command.

When the process command is received, the processing robot CR selects an optimal process timing based on the operation information of the paper sheet processing apparatus. When it comes to an execution timing, the processing robot CR moves closer to the paper sheet processing apparatus (for example, the main module 10) which is commanded as the processing target, and opens the cover 115. Next, the processing robot CR captures an image of the processing target portion by the electronic eye (the camera 85), and recognizes the presence/absence of a jammed banknote and a jammed position. After recognizing the jammed banknote, the processing robot CR holds the jammed banknote by the hand 54, and draws and eliminates the jammed banknote from the conveyance path. In addition, in a case where the jammed banknote is hard to hold, the processing robot CR rotates a conveyance roller near the jammed position by the hand 54, and moves the jammed banknote up to a position where the jammed banknote is taken out. Then, the jammed banknote is held by the hand 54, and drawn and released from the conveyance path.

The processing robot CR moves the jammed banknote to the vicinity of a predetermined storage section while holding the jammed banknote, and moves the jammed banknote to the storage section. Thereafter, the processing robot CR closes the cover 115 of the main module 10, and ends the jam releasing process. The processing robot CR notifies a releasing process completion to the paper sheet processing apparatus, and stores a jamming position, the number of times of occurrence, and a processing history in the memory 82 as the management information.

In addition, in a case where the releasing process is hard to be performed when the jammed banknote is recognized, the processing robot CR notifies a releasing process impossible to the paper sheet processing apparatus, and stops the processing operation. Accordingly, the main control unit 12 of the paper sheet processing apparatus displays a releasing impossible and a releasing processing required by an operator in the operation panel DP, and urges the operator to perform a releasing process.

7) Feeder Gap Adjustment

When detecting that a banknote is jammed, the main control unit 12 of the paper sheet processing apparatuses 100A and 100B stores the jammed portion and the number of times of occurrence in the memory 12b. The main control unit 12 frequently monitors the number of times of jamming at each position. In a case where the number of times of jamming at a certain position exceeds a predetermined threshold, the main control unit 12 determines that a jamming rate at that position is increased. When an increase of the jamming rate is detected, the main control unit 12 reads the processing code 009 corresponding to a jamming rate increase, a jammed portion from the process table TB, and a gap adjustment, and transmits the data to the processing robot CR as a process command.

When the process command is received, the processing robot CR selects an optimal process timing based on the operation information of the paper sheet processing apparatus. When it comes to an execution timing, the processing robot CR moves closer to the paper sheet processing apparatus (for example, the main module 10) which is commanded as the processing target, and opens the cover 115. Next, the processing robot CR captures an image of an adjustment portion of the processing target by the electronic eye (the camera 85), and recognizes an adjustment dial (not illustrated). Thereafter, the processing robot CR rotates the adjustment dial by the hand 54, and adjusts a feeder gap, for example, a gap between conveyance belts or a gap between conveyance guides. An adjustment amount is set to a predetermined adjustment amount which is set in advance, or an adjustment amount which is designated from the paper sheet processing apparatus.

After the adjustment is ended, the processing robot CR notifies the adjustment completion to the paper sheet processing apparatus after closing the cover 115, and stores the adjustment portion and the adjustment history in the memory 82 as the management information. Then, the feeder gap adjustment process of the processing robot CR is ended. Further, the processing robot CR estimates an increase of the jamming rate based on the operation information of the paper sheet processing apparatus, and may perform the feeder gap adjustment by its own determination.

Besides the above-described processes, the processing robot CR may perform various types of processes. For example, the banknotes stacked from one paper sheet processing apparatus may be taken out by the processing robot CR, and be loaded on the other paper sheet processing apparatus.

In addition, the main control unit 12 of the paper sheet processing apparatuses 100A and 100B timely detects, for example, a symptom of a failure of the device and a performance degradation based on the sensor outputs of the optical sensors. In a case where a symptom of a failure and a performance degradation, the main control unit 12 displays, for example, a failure prediction in the operation panel DP to notify the operator, and transmits the failure prediction to the processing robot CR. The main control unit 12 determines which one of the operator (service person) or the processing robot CR maintains. Accordingly, the service person or the processing robot CR can supply a maintenance part to the paper sheet processing apparatuses 100A and 100B just in time.

According to the paper sheet processing system of the embodiment configured as described above, various types of processes can be automatically performed on the paper sheet processing apparatus by the processing robot, so that a throughput of the entire system can be improved. In addition, with the learning function of the processing robot, the optimization of the process timing and the optimization of the processing target can be achieved, and the processes can be performed with more efficiency.

FIG. 23 illustrates another exemplary layout of a plurality of the paper sheet processing apparatuses 100A and 100B in the paper sheet processing system 1. Two paper sheet processing apparatuses 100A and 100B are not limited to a case where the devices are disposed in parallel in a planar direction, and may be disposed to be overlapped in a height direction. For example, the paper sheet processing apparatus 100A is provided on a low table 200, and the paper sheet processing apparatus 100B is provided on a high table 210 which is disposed to be overlapped on the paper sheet processing apparatus 100A.

With the above-described layout, it is possible to reduce an installation space of the paper sheet processing system 1, to shorten a moving distance of the processing robot CR, and to improve a process efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A paper sheet processing system comprising:
   a paper sheet processing apparatus comprising
   an inspection device which inspects a plurality of input paper sheets and a batch card input together with the paper sheets,
   a reject device which discharges the batch card to a rejecting port together with a rejected paper sheet not satisfying a predetermined condition in the paper sheets inspected by the inspection device, and
   a first communication module configured to transmit a predetermined signal indicating that the inspection performed reaches a predetermined unit amount of processing when the batch card is detected by the inspection device; and
a robot device comprising
 a robot arm which is capable of holding the paper sheet, and
 a second communication module configured to transmit and receive a signal, wherein
 when the second communication module receives the predetermined signal, the robot device takes out the rejected paper sheet and the batch card by the robot arm and moves to another storage section, and transmits a move completion notification of the rejected paper sheet and the batch card to the paper sheet processing apparatus from the second communication module.

2. The paper sheet processing system of claim 1, wherein the robot device stores a bundle of the rejected paper sheets together with the batch card in the storage section at every batch.

3. The paper sheet processing system of claim 1, wherein the robot device takes a bundle of the rejected paper sheets and the batch card out of the rejecting port, and supplies the bundle of the rejected paper sheets and the batch card to the paper sheet processing apparatus, and performs the inspection again by the inspection device.

4. A method of processing paper sheets by a paper sheet processing system which comprises a paper sheet processing apparatus which comprises an inspection device configured to inspect paper sheets and a reject device to reject the paper sheets to a rejecting port, and a robot device comprising a robot hand capable of holding paper sheets, the method comprising:
 sequentially inspecting a bundle of a plurality of paper sheets input to the paper sheet processing apparatus and a batch card at the end of the bundle one by one by the inspection device;
 determining a paper sheet determined as not satisfying a predetermined condition in the inspecting as a rejecting paper sheet;
 rejecting the rejecting paper sheet and the batch card to the rejecting port by the reject device;
 transmitting a predetermined signal indicating that the inspecting performed reaches a predetermined unit amount of processing when the batch card is detected;
 taking the rejected paper sheet and the batch card out of the rejecting port by the robot device when the robot device receives the predetermined signal, and moves to a storage section; and
 transmitting a signal to notify a move completion of the rejecting paper sheet from the robot device to the paper sheet processing apparatus.

5. A paper sheet processing system comprising:
a paper sheet processing apparatus; and
a processing robot configured to perform an arbitrary process with respect to the paper sheet processing apparatus, wherein
the paper sheet processing apparatus comprises an inspection device which inspects input paper sheets, a stacking device which stacks the inspected paper sheets, a conveyance mechanism which transfers the input paper sheets to the stacking device through the inspection device, a plurality of sensors which detect an operation state of the paper sheet processing device, a first communication module which transmits and receives data with respect to the processing robot, and a controller which detects an operation state of the paper sheet processing apparatus based on output signals of the sensors, transmits operation information including the detected operation state to the processing robot, and transmits a maintenance command of a target portion to the processing robot when a maintenance factor is detected based on the output signals of the sensors,
the processing robot comprises a robot arm, an end effector on the robot arm, a second communication module which transmits and receives data with respect to the first communication module, and a controller which comprises a memory in which the operation information transmitted from the paper sheet processing apparatus is stored and drives the robot arm and the end effector, and
the processing robot selects an optimal maintenance timing to the paper sheet processing apparatus based on the operation information stored in the memory when the maintenance command is received, and performs maintenance the target portion at the optimal maintenance timing.

6. The paper sheet processing system of claim 5, wherein the paper sheet processing apparatus comprises a housing which comprises a cover openable and closable, and a mechanism section arranged in the housing and comprising the inspection device, the stacking device, the conveyance mechanism, and the sensors, and
the processing robot is configured to move closer to the target portion according to the maintenance command transmitted from the paper sheet processing apparatus, opens the cover by the robot arm and the end effector, and performs a process on the target portion by the end effector.

7. The paper sheet processing system of claim 6, wherein when a specific sensor having a sensor output lower than a predetermined value is detected, the controller of the paper sheet processing apparatus transmits a cleaning command of the specific sensor to the processing robot, and
the processing robot opens the cover according to the cleaning command, and cleans the specific sensor by the end effector.

8. The paper sheet processing system of claim 7, further comprising: a blower device which comprises an injection nozzle to inject an air, wherein
the processing robot is configured to hold the injection nozzle by the end effector, and inject an air from the injection nozzle toward the specific sensor.

9. The paper sheet processing system of claim 7, further comprising: a vacuum device which comprises a suction nozzle to absorb an air, wherein
the processing robot is configured to hold the suction nozzle by the end effector, and absorb an air around the specific sensor by the suction nozzle.

10. The paper sheet processing system of claim 6, wherein the mechanism section comprises a collecting box which collects a foreign material, and a sensor which detects a foreign material in the collecting box,
the housing comprises a second cover which is openable and closable and covers the collecting box,
the controller of the paper sheet processing apparatus transmits a foreign material discarding command to the processing robot when a foreign material is detected by the sensor, and
the processing robot is configured to open the second cover according to the foreign material discarding command, hold the collecting box by the end effector, and draw out the collecting box to discard a foreign material in the collecting box.

11. A paper sheet processing system comprising:
a paper sheet processing apparatus; and
a processing robot which performs an arbitrary process on the paper sheet processing apparatus, wherein
the paper sheet processing apparatus comprises an inspection device which inspects input paper sheets, a stacking device which stacks the inspected paper sheets, a conveyance mechanism which transfers the input paper sheets to the stacking device through the inspection device, a plurality of sensors which detect an operation state of the paper sheet processing apparatus, a controller which detects an operation state of the paper sheet processing device based on the output signals of the sensors, and a first communication module configured to transmit information to the processing robot, wherein
the controller comprises a process table in which a plurality of processing factors, a plurality of processing target portions, and a plurality of processing contents are associated to one another,
when any one of the processing factors is detected based on output signals of the sensors, the controller reads a processing target portion and a processing content corresponding to the detected processing factor from the process table, and transmits the read processing target portion and the read processing content to the processing robot as a process command, and
the processing robot comprises a robot arm, a second communication module which transfers processing information between the first communication module, an end effector on the robot arm, and a controller which drives the robot arm and the end effector, wherein
the processing robot performs a process on the processing target portion according to the process command transmitted from the paper sheet processing apparatus.

12. The paper sheet processing system of claim 11, wherein the process table includes a residual sheet reduction, a batch card detection, a jam detection, a sensor output reduction, a rejection rate increase, a foreign material detection, and a jam rate increase as the processing factor,
the process table includes the paper sheet processing apparatus, a discharge port, a jammed portion, the sensors, the inspection device, a foreign material collecting box, and an adjustment portion as the processing target portion corresponding to the processing factor, and
the process table includes a paper sheet loading, a rejected paper sheet collecting, a jam releasing, a cleaning, a foreign material discarding, and a gap adjustment as the processing content corresponding to the processing factor.

13. The paper sheet processing system of claim 12, further comprising:
a storage cassette which stores a plurality of paper sheet bundles, each of which includes a plurality of paper sheets and a batch card, wherein
the paper sheet processing apparatus comprises a supply device which loads a paper sheet bundle, and a pick-up mechanism which takes out the paper sheets one by one from the supply device to deliver the taken-out paper sheets to the inspection device,
when a residual sheet reduction in the supply device is detected, the controller of the paper sheet processing apparatus reads a paper sheet loading process corresponding to the residual reduction from the process table, and transmits a paper sheet loading command to the processing robot together with a target portion, and
the processing robot takes a paper sheet bundle and a batch card out of the storage cassette by the robot arm and the end effector according to the paper sheet loading command, and loads the paper sheet bundle and the batch card to the supply device.

14. The paper sheet processing system of claim 13, wherein the storage cassette comprises a display portion which displays information on the stored paper sheet bundles,
the processing robot comprises an electronic eye, and
in the paper sheet loading process, the processing robot reads information displayed in the display portion of the storage cassette by the electronic eye, selects a paper sheet bundle which is optimal to the paper sheet processing apparatus based on the read information, takes the selected paper sheet bundle out of the storage cassette by the robot arm and the end effector, and loads the selected paper sheet bundle to the paper sheet processing apparatus.

* * * * *